United States Patent
Koo

(10) Patent No.: US 7,521,957 B2
(45) Date of Patent: Apr. 21, 2009

(54) IMPEDANCE CONTROLLER FOR SEMICONDUCTOR DEVICE

(75) Inventor: Kyung-Hoi Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 11/409,756

(22) Filed: Apr. 24, 2006

(65) Prior Publication Data

US 2006/0279345 A1 Dec. 14, 2006

(30) Foreign Application Priority Data

Jun. 9, 2005 (KR) .................. 10-2005-0049305

(51) Int. Cl.
*H03K 17/16* (2006.01)
*H03K 19/003* (2006.01)
*H03B 1/00* (2006.01)

(52) U.S. Cl. .................... 326/30; 327/108; 710/106
(58) Field of Classification Search .......... 326/30, 326/87; 365/189.05, 189.11; 327/108; 710/106
See application file for complete search history.

(56) References Cited

U.S. PATENT DOCUMENTS

| | | | |
|---|---|---|---|
| 6,307,424 B1* | 10/2001 | Lee | 327/530 |
| 6,828,820 B2* | 12/2004 | Ohno | 326/30 |
| 7,084,663 B2* | 8/2006 | Oguri | 326/30 |
| 7,382,152 B2* | 6/2008 | Hamanaka | 326/30 |
| 2003/0231523 A1* | 12/2003 | Cho et al. | 365/189.05 |
| 2005/0276126 A1* | 12/2005 | Choi et al. | 365/189.05 |
| 2008/0054935 A1* | 3/2008 | Pan | 326/30 |

OTHER PUBLICATIONS

Korean Patent Application No. 1020010048289 to Koo et al., having Publication date of Feb. 15, 2003 (w/ English Abstract page).
Korean Patent Application No. 1020020033129 to Cho et al., having Publication date of Dec. 31, 2003 (w/ English Abstract page).
Japanese Patent Application No. 09-305929 to Yasuhisa et al., having Publication date of May 28, 1999 (w/ English Abstract page).
Japanese Patent Application No. 2003-188721 to Takashi, having Publication date of Jan. 27, 2005 (w/ English Abstract page).

* cited by examiner

*Primary Examiner*—Rexford Barnie
*Assistant Examiner*—Dylan White
(74) *Attorney, Agent, or Firm*—Monica H. Choi

(57) ABSTRACT

An impedance controller includes multiple determination units for determining which of multiple candidate codes results in a best impedance match for an I/O pad of a semiconductor device. In addition, an error prevention unit of the impedance controller prevents any undesired bit pattern from causing improper operation of the impedance controller. Furthermore, the impedance controller includes a dummy transistor array for improved linearity of impedance variation.

20 Claims, 19 Drawing Sheets

IMPEDANCE CONTROLLER FOR SEMICONDUCTOR DEVICE

BACKGROUND OF THE INVENTION

This application claims priority to Korean Patent Application No. 2005-49305, filed on Jun. 9, 2005 in the Korean Intellectual Property Office, the disclosure of which is incorporated herein in its entirety by reference.

1. Field of the Invention

The present invention relates generally to controlling impedance at an I/O (input/out) pad of a semiconductor device, and more particularly to more accurately matching such impedance to an external impedance.

2. Description of the Related Art

Generally, semiconductor devices such as a microprocessor, a field-programmable gate array (FPGA), a controller and a memory device are mounted on a printed circuit board (PCB) for forming an electronic system. Each semiconductor device is coupled to at least one other semiconductor device through a transmission line, such as a PCB wire.

For data transmission with preserved signal integrity, impedance matching is desired between an I/O (input/output) pin of the semiconductor device and the transmission line. With increased operating speed, signal amplitude in the semiconductor device has been decreasing such that such impedance matching is even more important.

FIG. 1 shows a block diagram of a conventional impedance controller as disclosed in Korean Patent Laid-Open Publication No. 2003-96564. The impedance controller 26 includes PMOSFETs (P-channel metal oxide semiconductor field effect transistors) P1 and P2.

The PMOSFET P1 is coupled to a pull-up control path for controlling a pull-up transistor group of an output buffer, and the PMOSFET P2 is coupled to a pull-down control path for controlling a pull-down transistor group in the output buffer. The PMOSFET P1 has a source coupled to a power voltage VDDQ and a drain coupled to a ZQ terminal. VDDQ is equal to a power voltage for driving the output buffer.

The pull-up control path includes a PMOS array 102, an operational amplifier 103, an up/down counter 104, a dithering detector 105, a register 106, a clock generator 107, and a transmitter 108. The pull-down path includes an NMOSFET array 110, an operational amplifier 111, an up/down counter 112, a dithering detector 113, and a register 114.

A reference voltage generator (not shown in FIG. 1) generates a reference voltage VREF that is about VDDQ/2 for being applied on a negative input terminal of an operational amplifier 101 having an output for controlling the PMOSFET P1. A drain voltage VZQ of the PMOSFET P1 at the ZQ terminal is fed-back on a negative input terminal of the operational amplifier 101. Consequently, VZQ becomes substantially equal to the reference voltage VREF.

The reference voltage VREF is applied on a positive input terminal of the operational amplifier 103 having a negative input terminal coupled to a linkage node REFU between the drain of the PMOSFET P1 and the PMOS array 102. The up/down counter 104 generates a code (i.e., data bits $U_0$ through $U_{n-1}$) in response to an output UOUT of the operational amplifier 103. Each of n dummy transistors in the PMOS array 102 is turned on or off selectively depending on the data bits $U_0$ through $U_{n-}$. Consequently, a voltage at the linkage node REFU becomes substantially equal to the reference voltage VREF.

The PMOS array 102 includes n PMOSFETs having sources coupled to the power voltage VDDQ and having drains coupled to the linkage node REFU. Each gate of the n PMOSFETs is turned on or off by a respective one of the data bits $U_0$ through $U_{n-}$.

The dithering detector 105 receives the output UOUT of the operational amplifier 103 to activate a detection signal UDET when a predetermined condition is satisfied. Referring to FIG. 2, the dithering detector 105 activates the detection signal UDET with a high level when the output UOUT of the operational amplifier 103 is an alternating value of '1, 0, 1, 0, 1'.

The register 106 stores the data bits $U_0$ through $U_{n-1}$ provided from the up/down counter 104 when the dithering detector activates the detection signal UDET. The data bits $U_0$ through $U_{n-1}$ stored in the register 106 are transmitted to the output buffer through the transmitter 108.

The clock generator 107 generates a clock signal UP_CK that is used in the up/down counter 104 and the dithering detector 105, and a clock signal DN_CK that is used in the up/down counter 112 and the dithering detector 113 in the pull-down control path that operates in a similar manner as the pull-up control path.

The conventional impedance controller selectively turns on or off a plurality of transistors for matching an impedance of the output buffer to a reference impedance. Such matching is indicated by detecting an alternating bit pattern '1, 0, 1, 0, 1' from the output of the operational amplifier 103 or 111.

This method is also disclosed in Korean Patent Laid-Open Publication No. 2003-13983.

However, when the output impedance is precisely equal to the reference impedance in the conventional impedance controller, the output of the operational amplifier 103 or 111 may have an undesired bit pattern such as '1, 1, 0, 0, 1, 1, 0, 0', resulting in improper operation of the impedance controller. Furthermore, multiple codes may cause dithering in the conventional impedance controller. However, the conventional impedance controller selects just an arbitrary one of such codes to be transmitted without any regard to which of such codes results in better impedance matching.

SUMMARY OF THE INVENTION

Accordingly, an impedance controller of the present invention determines which of such multiple possible codes results in better impedance matching, and/or prevents any undesired bit pattern from causing improper operation of the impedance controller.

In an aspect of the present invention, an impedance controller includes an impedance control transistor array, a first determination unit and a second determination unit. The impedance control transistor array generates, from a code, a generated impedance at a predetermined node. The first determination unit determines two candidate codes for matching the generated impedance to a reference impedance, and the second determination unit selects one of the two candidate codes as a final code that best matches the generated impedance to the reference impedance.

In an example embodiment of the present invention, the first determination unit includes a comparator for comparing a generated voltage at the predetermined node to a reference voltage. A code generator generates the code depending on an output of the comparator, and a first controller determines the two candidate codes depending on a bit-pattern of the output of the comparator.

In another example embodiment of the present invention, the second determination unit includes a fine tuning unit that is activated by the first controller to adjust a respective effective impedance at the predetermined node for each of the two candidate codes. A second controller selects the final code depending on a respective output of the comparator for each of the two candidate codes with the fine tuning unit being activated. A register stores the final code.

In another aspect of the present invention, the impedance controller includes an error detector for detecting an undesired bit-pattern in the output of the comparator. In that case, an error prevention unit is activated for adjusting an effective impedance at the predetermined node such that the undesired bit-pattern is no longer output from the comparator.

In a further aspect of the present invention, an impedance controller includes a dummy code generator for generating a dummy code from the original code of the code generator. A dummy transistor array generates, from the dummy code, an additional impedance at the predetermined node for a predetermined set of the at least one original code. Such a feature is advantageous for adjusting the impedance to vary more linearly at lower values of the generated impedance.

Such embodiments of the impedance controller may be used to particular advantage when the impedance controller is fabricated within a semiconductor device. In that case, the final code determines an I/O impedance at an I/O pad of the semiconductor device when the reference impedance is substantially equal to an external impedance coupled to the I/O pad.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale.

DETAILED DESCRIPTION OF THE INVENTION

Figure 3:
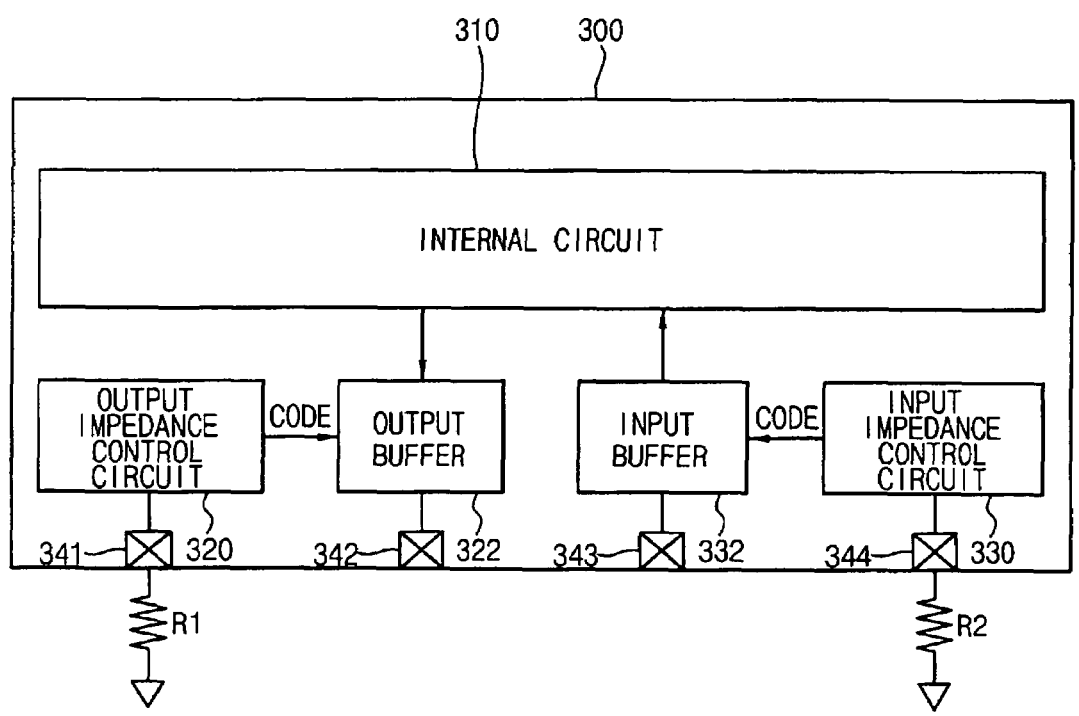
FIG. 3 is a block diagram of a semiconductor device according to an example embodiment of the present invention.

FIG. 3 is a block diagram of a semiconductor device 300 according to an example embodiment of the present invention. The semiconductor device 300 may be a microprocessor, a field-programmable gate array (FPGA), a memory device, or any combination thereof.

The semiconductor device 300 includes an internal circuit 310, an output buffer 322, an input buffer 332, an output impedance controller 320, and an input impedance controller 330. Such components are fabricated within the semiconductor device 300 in one example embodiment of the present invention.

The internal circuit 310 outputs internal data through the output buffer 322, and receives external data through the input buffer 332. An output signal passes through the output buffer 322 via an output pad 342 for transfer to an external device. When an external impedance coupled to the pad 342 is not equal to an output impedance generated by the output buffer 322, some of the output signal may be reflected from the pad 342 to the output buffer 322 such that the signal outputted from the semiconductor device 300 is degraded.

The output impedance controller 320 controls the output impedance generated by the output buffer 322 to be matched to the external impedance coupled to the pad 342. Thus, a reference impedance R1 corresponding to the external impedance of the pad 342 is coupled to a pad 341. Then, the output impedance controller 320 determines a code corresponding to the impedance R1 and transmits such a code to the output buffer 322.

Similarly, an input signal passes through the input buffer 332 via a pad 343 for transfer to the internal circuit 310. When an external impedance coupled to the pad 343 is not equal to the impedance of the input buffer 332, some of the input signal may be reflected from the pad 343 to the external device such that the input signal is degraded.

The input impedance controller 330 controls the input impedance generated by the input buffer 332 to be matched to the external impedance of the pad 343. Thus, a reference impedance R2 corresponding to the external impedance of the pad 343 is coupled to a pad 344. Then, the input impedance controller 330 determines a code corresponding to the impedance R2 and transmits such a code to the input buffer 332.

Figure 4:
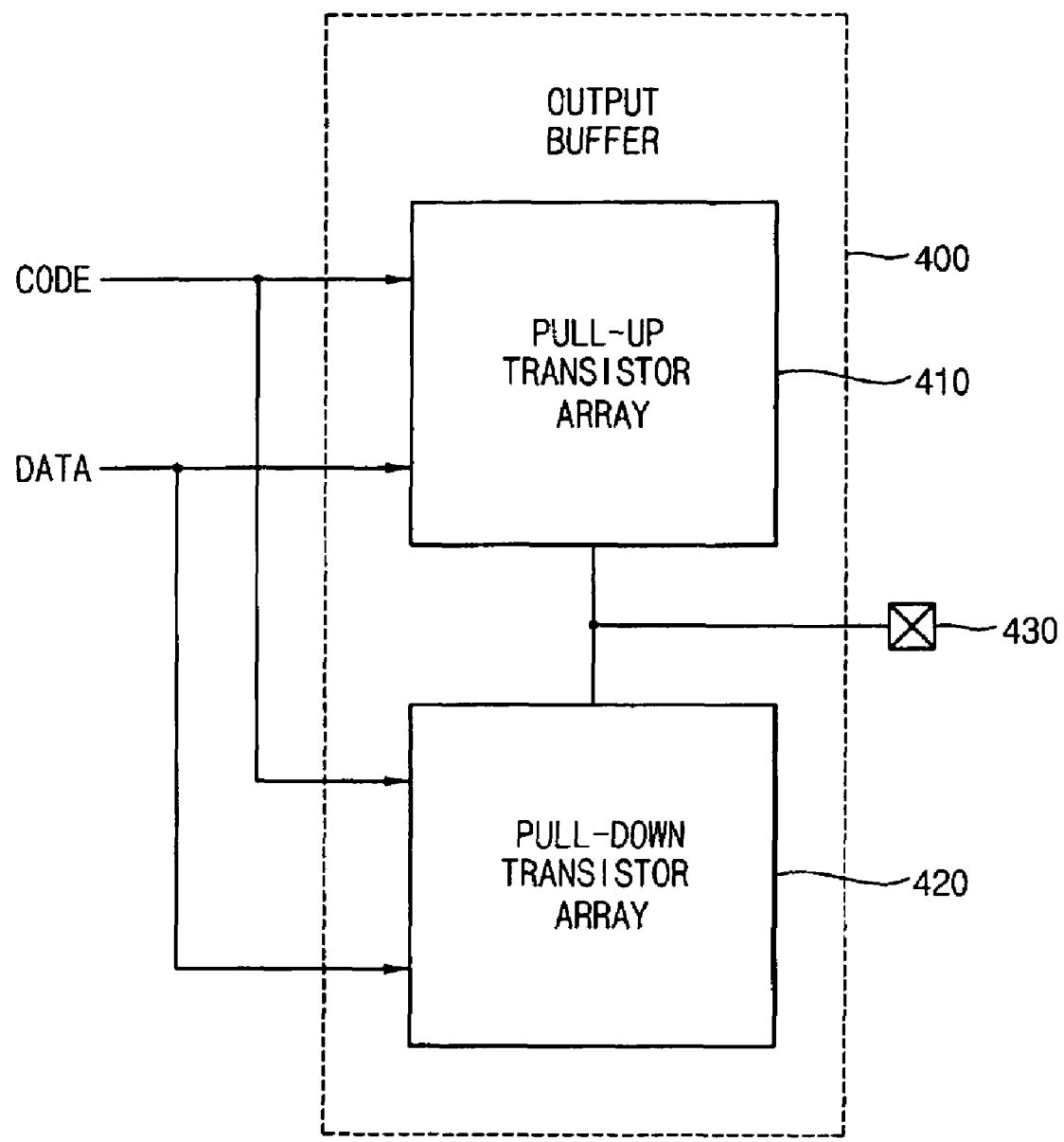
FIG. 4 is a block diagram of an output buffer according to an example embodiment of the present invention.

FIG. 4 is a block diagram of an output buffer 400 such as the buffer 322 of FIG. 3, according to an example embodiment of the present invention. The output buffer 400 includes a pull-up transistor array 410 and a pull-down transistor array 420, and outputs data through an output pad 430. When a data value is equal to '1', such data is output through the pull-up transistor array 410, and when the data value is equal to '0', such data is output through the pull-down transistor array 420. Impedances generated by the pull-up transistor array 410 and the pull-down transistor array 420 are determined by a code as determined by an impedance controller.

Figure 5A:
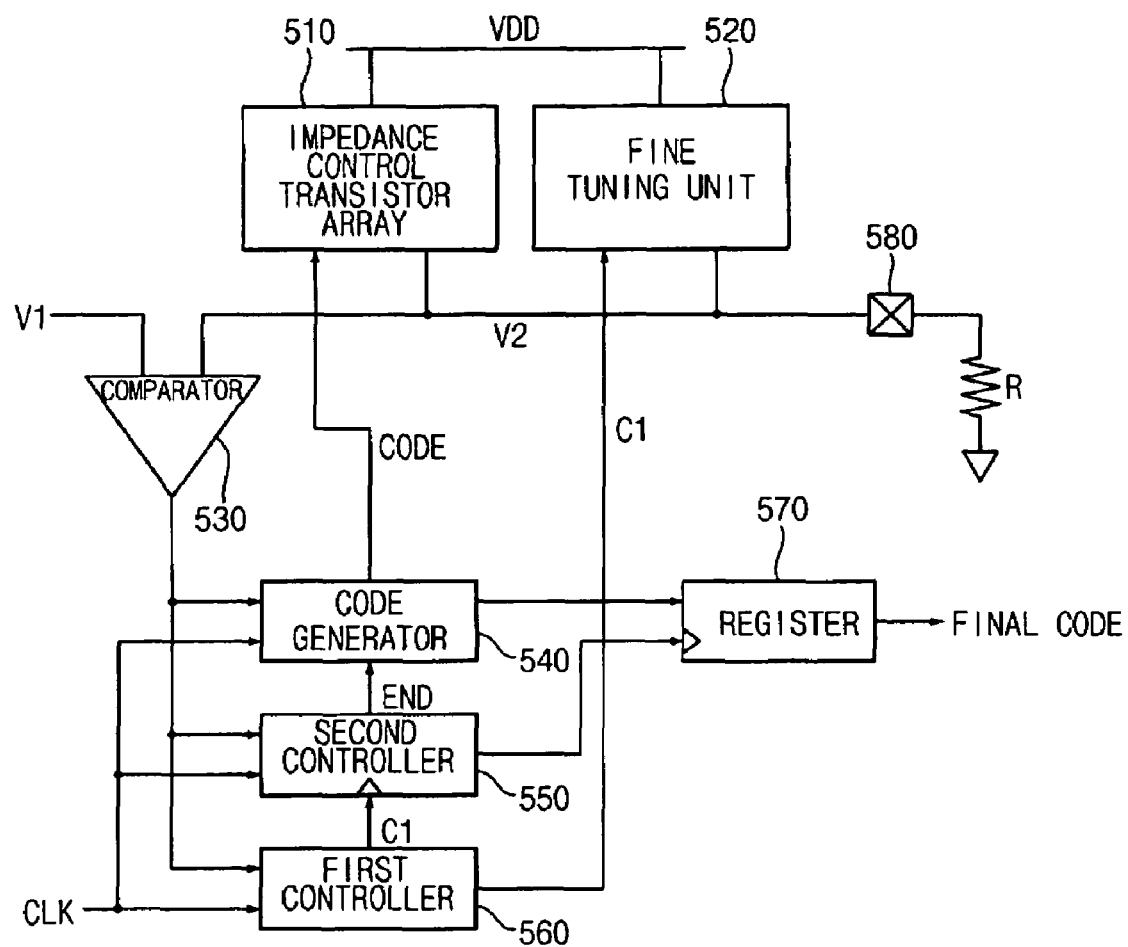
FIG. 5A is a block diagram of an impedance controller according to an example embodiment of the present invention.

FIG. 5A is a block diagram of an impedance controller according to an example embodiment of the present invention. The impedance controller of FIG. 5A includes an impedance control transistor array 510, a first determination unit, and a second determination unit. The impedance control transistor array 510 includes a plurality of transistors that provide a generated impedance depending on which transistor is turned on or off by a code value CODE generated by a code generator 540.

The first determination unit includes a comparator 530, the code generator 540, and a first controller 560. The first determination unit determines two candidate codes for matching the generated impedance of the impedance control transistor array 510 to a reference impedance R.

The second determination unit includes a fine tuning unit 520, a second controller 550, and a register 570. The second determination unit selects one of the two candidate codes as a final code that results is a best match of the generated impedance of the impedance control transistor array 510 to the reference impedance R.

The comparator 530 outputs a logic value from comparing a reference voltage V1 with a node voltage V2 generated at a predetermined node of a pad 580. For example, when the node voltage V2 is greater than the reference voltage V1, the comparator 530 outputs a logic '1', and when the node voltage V2 is less than the reference voltage V1, the comparator 530 outputs a logic '0'.

Alternatively, the present invention may also be practiced with the comparator 530 outputting a logic '0' when the node voltage V2 is greater than the reference voltage V1, and outputting a logic '1' when the node voltage V2 is less than the reference voltage V1. When the reference voltage V1 is substantially equal to the node voltage V2, the comparator 530 may maintain the last logic value.

A first end of the reference impedance R is coupled to the predetermined node having the node voltage V2 through the pad 580. A second end of the reference impedance R is coupled to ground such that the node voltage V2 is expressed by the following equation 1:

[Equation 1]

$$V_2 = \frac{R}{R + R_a} \cdot VDD$$

Ra is an effective impedance at the predetermined node that is synthesized from the generated impedance of the impedance control transistor array 510 and an impedance of the fine tuning unit 520.

Initially, the fine tuning unit 520 is turned off when a control signal C1 from the first controller 560 is de-asserted during determination of two candidate codes for matching the generated impedance of the impedance control transistor array 510 to the reference impedance R. The generated impedance of the impedance control transistor array 510 becomes equal to the reference impedance R when the node voltage V2 is 'one half of a power voltage VDD'.

The reference voltage V1 is set to 'one half of the power voltage VDD', and the impedance controller determines the CODE such that the node voltage V2 is substantially equal to the reference voltage V1. In that case, the generated impedance of the impedance control transistor array 510 is substantially equal to the reference impedance R.

Alternatively, when the reference voltage V1 is set to 'one third of the power voltage VDD', the impedance controller determines the CODE such that the generated impedance of the impedance control transistor array 510 is substantially equal to twice the reference impedance R. Similarly, when the reference voltage V1 is set to 'two thirds of the power voltage VDD', the impedance controller determines the CODE such that the generated impedance of the impedance control transistor array 510 is substantially equal to one half of the reference impedance R.

For the following description, assume that the reference voltage V1 is one half of the power voltage VDD, and that the CODE has a three-bit value. The code generator 540 increases or decreases the CODE for adjusting the generated impedance of the impedance control transistor array 510 until the reference voltage V1 is substantially equal to the node voltage V2.

Figure 1:
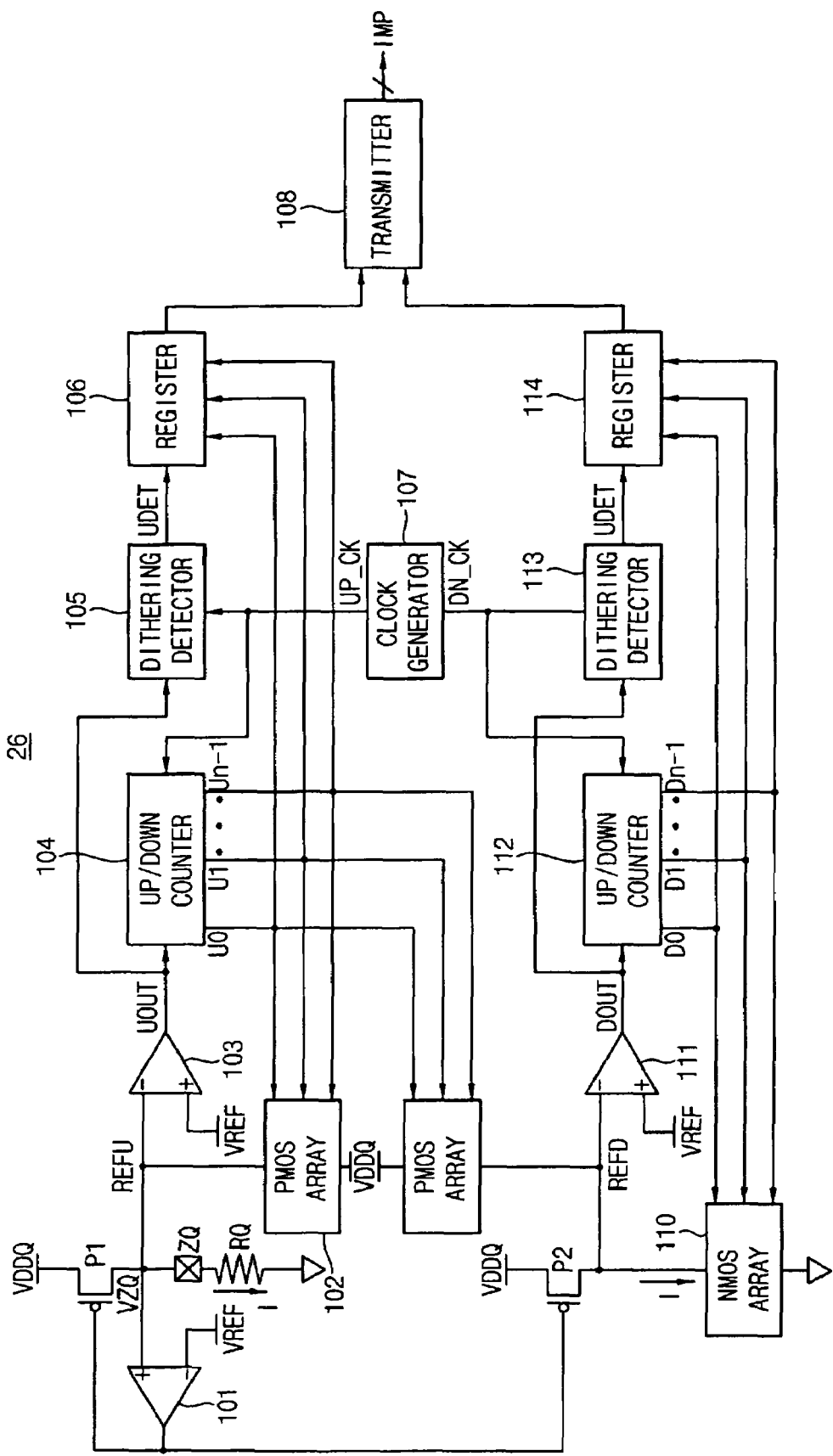
FIG. 1 is a block diagram of a conventional impedance controller.
Figure 2:
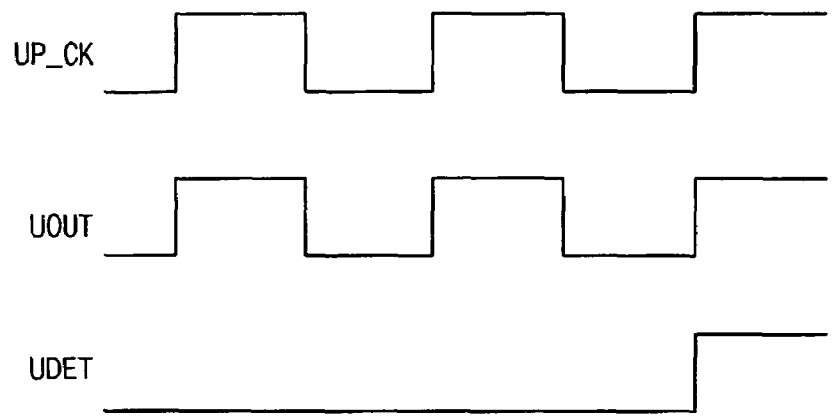
FIG. 2 is a timing diagram of signals during operation of a dithering detector in FIG. 1.

The first controller 560 determines two candidate codes where the generated impedance of the impedance control transistor array 510 substantially matches the reference impedance R. The conventional impedance controller of FIG. 1 arbitrarily uses any one candidate code as a final code. In contrast, the impedance controller of an example embodiment of the present invention selects from the two candidate codes as a final code for a best impedance match.

The first controller 560 detects a predetermined bit pattern in the output of the comparator 530, such as '10101' for determining such two candidate codes. For example, when the first controller 560 detects the bit-pattern of '10101' from the comparator 530, the first controller 560 determines as a first candidate code and a second candidate code. That is, the first controller 560 determines the first candidate code (such as '011' in FIG. 7A for example as generated by the code generator 540) that causes the comparator 530 to output the last '0' (i.e., the fourth-most significant bit '0') in the bit-pattern '10101' output by the comparator 530. In addition, the first controller 560 determines the second candidate code (such as '010' in FIG. 7A for example as generated by the code generator 540) that causes the comparator 530 to output the last '1' (i.e., the fifth-most significant bit '1') in the bit-pattern '10101' output by the comparator 530.

After determining such two candidate codes, the first controller 560 asserts the control signal C1 transmitted to the fine tuning unit 520. The fine tuning unit 520 turns on in response to the asserted C1 for determining which of the two candidate codes has better impedance matching.

The fine tuning unit 520 is coupled to the impedance control transistor array 510, and when turned on, adjusts the effective resistance at the predetermined node with the voltage V2 generated thereon. Thus, when the fine tuning unit 520 is activated, the node voltage V2 varies, but the output of the comparator 530 may or may not be changed.

Figure 7A:
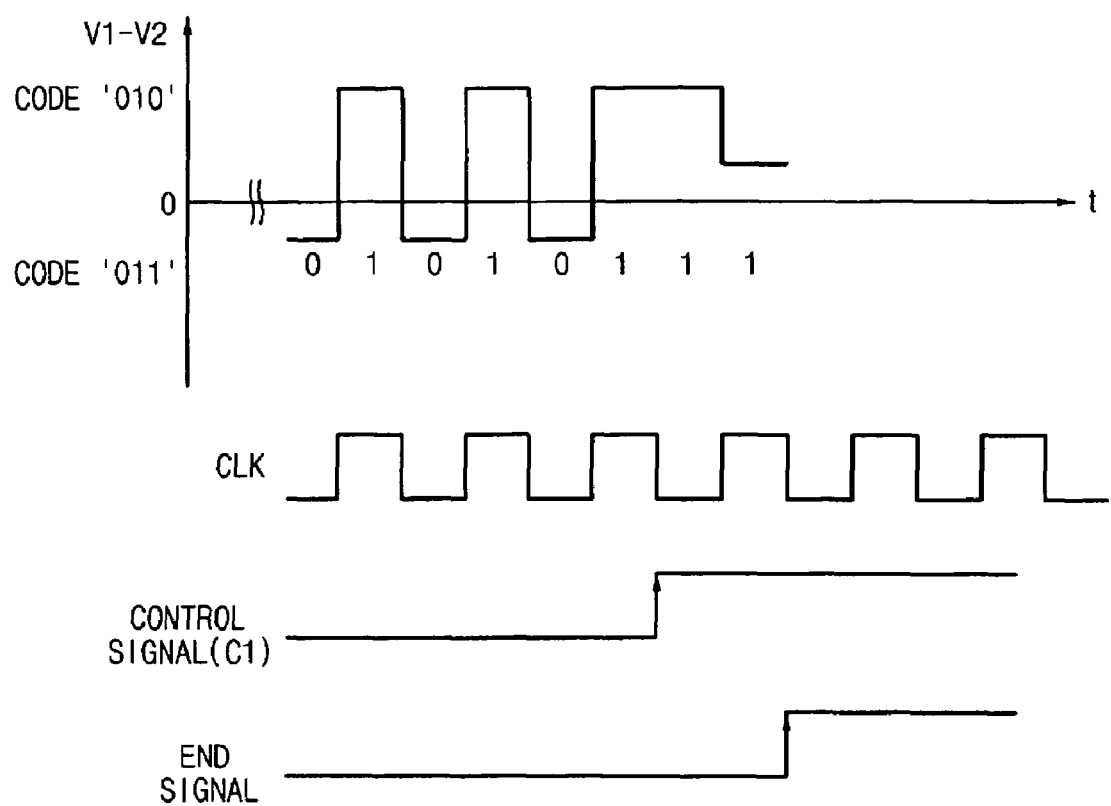
FIGS. 7A and 7B are timing diagrams of signals during operation of the impedance controller of FIG. 5A or 5B according to an example embodiment of the present invention.
Figure 7B:
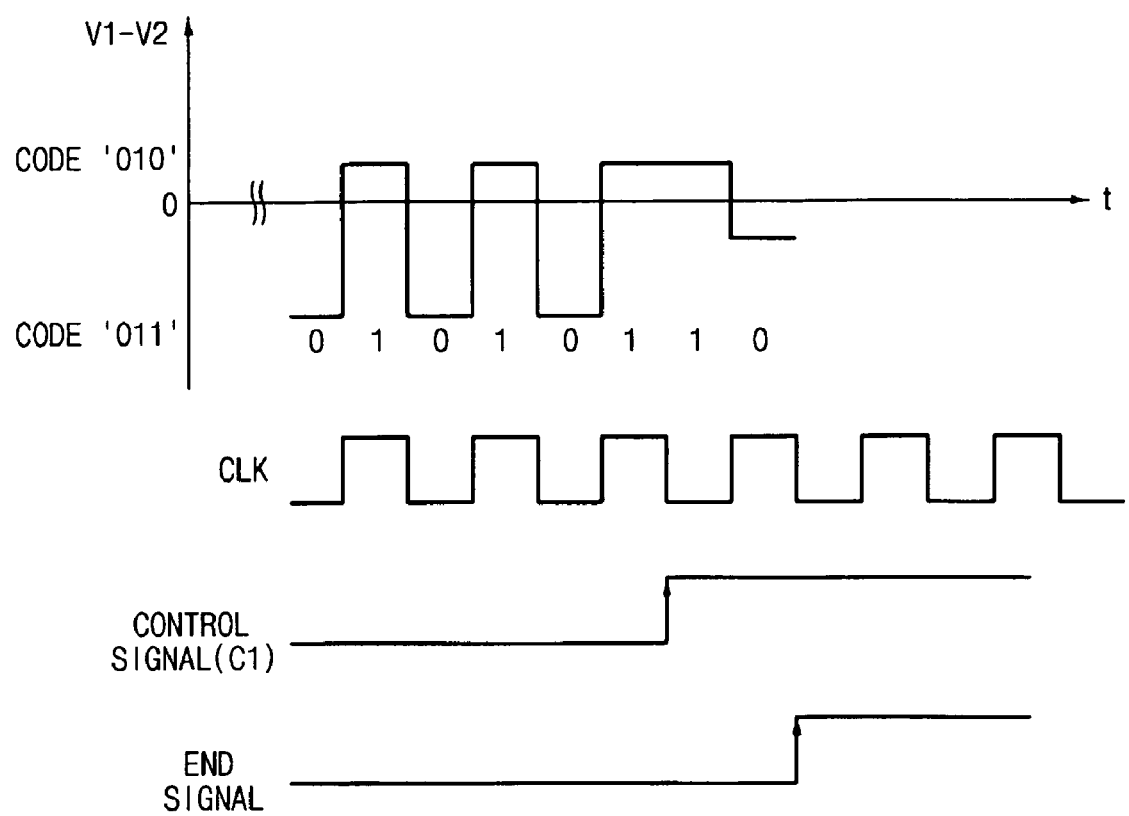

The second controller 550 selects the final code between the two candidate codes from the output of the comparator 530 after the fine tuning unit 520 is turned on. The register 570 stores such a final code that is provided to an I/O buffer (not shown in FIG. 5A) for determining an I/O impedance generated by the I/O buffer. FIGS. 7A and 7B are timing diagrams of relevant signals when the second controller 550 selects the final code among the two candidate codes.

When the CODE has a binary value of '000', the generated impedance from the impedance control transistor array 510 has the highest value. As the binary value of the CODE is increased through '001', '010', '011', '100', '101' and '110', the generated impedance from the impedance control transistor array 510 decreases successively. When the CODE has a binary value of '111', the generated impedance from the impedance control transistor array 510 has the lowest value.

When the CODE initially has a binary value '000', the generated impedance of the impedance control transistor array 510 has the highest value such that the node voltage V2 has the lowest value. In that case, the reference voltage V1 is greater than the node voltage V2, and the comparator 530 outputs a logic '0' such that the code generator 540 increases the CODE to '001'.

If the comparator 530 continues to output a logic '0', the code generator 540 increases the CODE to '011'. If the comparator 530 then outputs a logic '1' as a result, the code generator 540 decreases the CODE back to '010'. Subsequently, the comparator 530 outputs a logic '0', and the code generator 540 increases the CODE to '011'.

With such alternating values of the CODE, the first controller 560 selects the two candidate codes as '010' and '011' upon detection of the predetermined bit pattern '10101' from the comparator 530.

The first controller 560 then asserts the control signal C1 for turning on the second controller 550 and the fine tuning unit 520. When the fine tuning unit 520 is turned on, the node voltage V2 increases such that the voltage difference V1-V2 decreases.

Referring now to FIG. 7A, if the fine tuning unit 520 is turned on and the output of the comparator 530 does not change, the higher of the two candidate codes (i.e., '011') is selected to be the final code. FIG. 7A illustrates such a scenario where the V1-V2 values are closer to zero for the code '011'.

In contrast, referring to FIG. 7B, if the fine tuning unit 520 is turned on and the output of the comparator 530 does change, the lower of the two candidate codes (i.e., '010') is selected to be the final code. FIG. 7B illustrates such a scenario where the V1-V2 values are closer to zero for the code '010'.

After determining the final code, the second controller 550 asserts an end signal in FIGS. 7A and 7B. The end signal is provided to the code generator 540 that then stores the final code into the register 570.

In FIG. 5A, the first controller 560 transmits the control signal C1 to the fine tuning unit 520 directly. However, the present invention may also be practiced with the first controller 560 transmitting the control signal C1 to the fine tuning unit 520 through the second controller 550.

Additionally, FIG. 5A illustrates the first and second controllers 560 and 550 as being implemented separately. However, the present invention may also be practiced when the first and second controllers 560 and 550 are implemented as one controller.

Figure 5B:
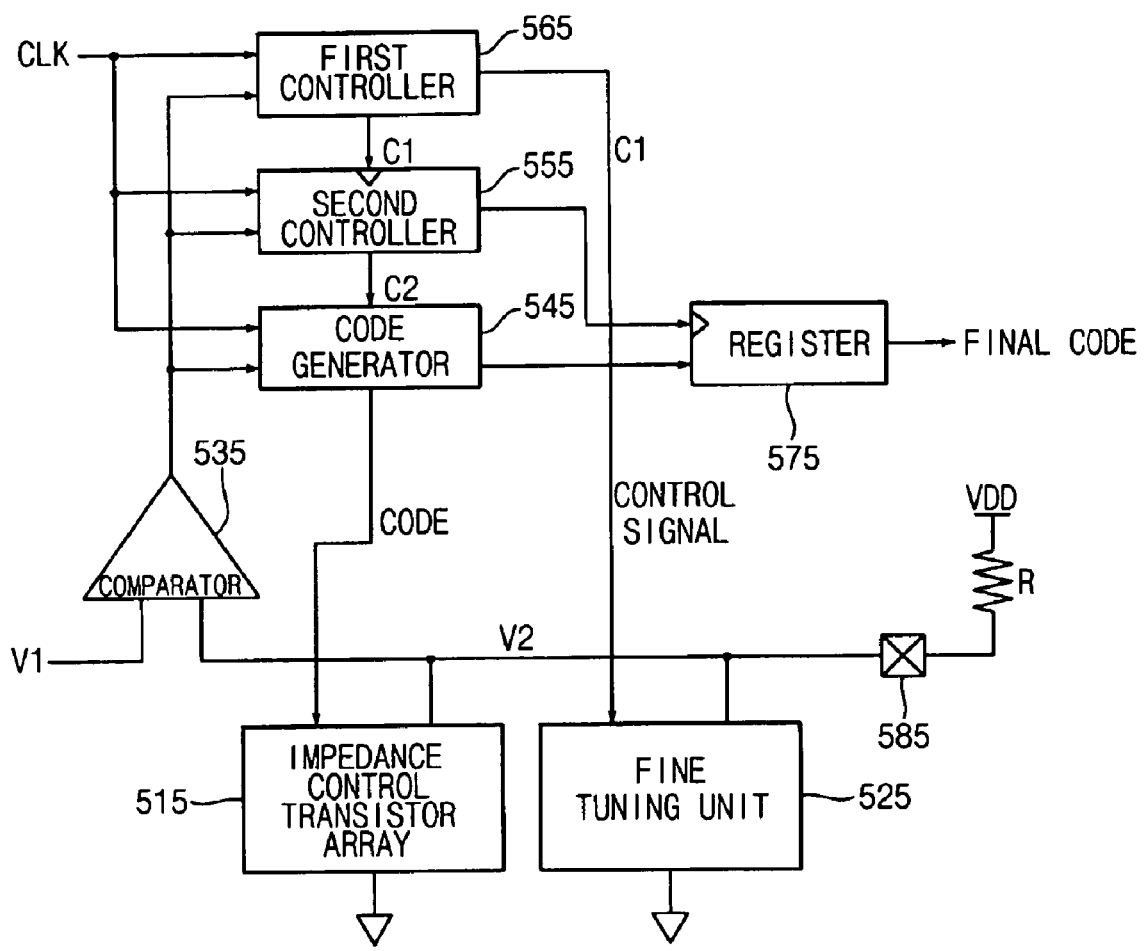
FIG. 5B is a block diagram of an impedance controller according to another example embodiment of the present invention.

FIG. 5B is a block diagram of an impedance controller according to another example embodiment of the present invention. Referring to FIG. 5B, the impedance controller includes an impedance control transistor array 515 and a fine tuning unit 525. The impedance control transistor array 515 is coupled to the ground node, and a reference impedance R has one end coupled to a power supply voltage VDD and another end coupled to an I/O pad 585. A node voltage V2 generated at a predetermined node is expressed by the following Equation 2.

$$V_2 = \frac{R_a}{R + R_a} \cdot VDD \quad \text{[Equation 2]}$$

Ra is an effective impedance at the predetermined node that is synthesized from the generated impedance of the impedance control transistor array 515 and an impedance of the fine tuning unit 525.

The impedance controller of FIG. 5B also includes a comparator 535, a code generator 545, a first controller 565, a second controller 555, and a register 575. The impedance controller of FIG. 5B operates similarly to the impedance controller of FIG. 5A. Thus, operation of the impedance control transistor array 515, the fine tuning unit 525, the comparator 535, the code generator 545, the first controller 565, the second controller 555, and the register 575 in FIG. 5B respectively corresponds to that of the impedance control transistor array 510, the fine tuning unit 520, the comparator 530, the code generator 540, the first controller 560, the second controller 550, and the register 570 in FIG. 5A.

One difference is that the node voltage V2 increases with increased generated impedance of the impedance control transistor array 514 in FIG. 5B. However, operation of the impedance controller of FIG. 5B would be apparent from the description of the operation of the impedance controller of FIG. 5A herein.

Figure 6A:
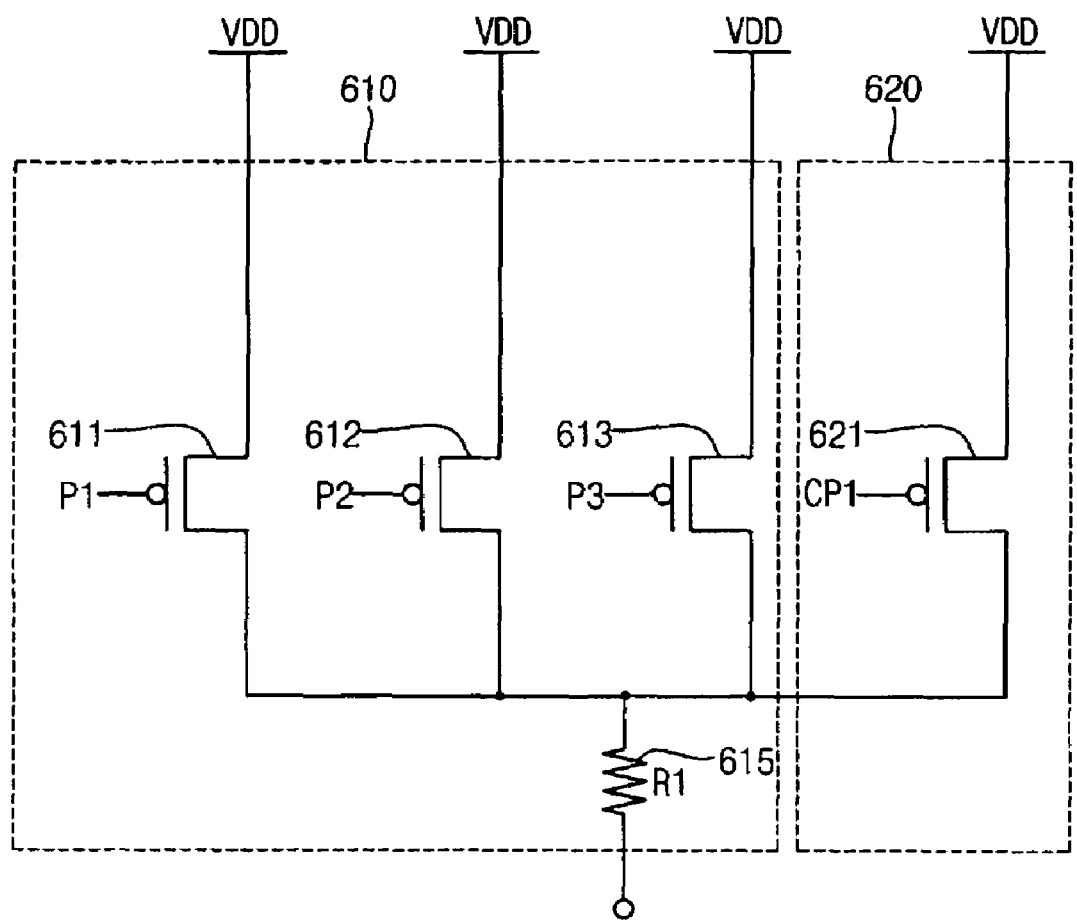
FIGS. 6A, 6B, and 6C are circuit diagrams of an impedance control transistor array and a fine tuning unit, according to various example embodiments of the present invention.

FIG. 6A is a circuit diagram of an impedance control transistor array 610 and a fine tuning unit 620 according to an example embodiment of the present invention. The impedance control transistor array 610 and the fine tuning unit 620 of FIG. 6A may be used as the respective impedance control transistor array 510 and the fine tuning unit 520 of FIG. 5A.

Referring to FIG. 6A, the impedance control transistor array 610 includes three PMOSFETs 611, 612, and 613 coupled in parallel and a resistor 615. The PMOSFETs 611, 612, and 613 have sources coupled together to a power supply VDD, and have drains coupled together to a first end of the resistor 615. Each of the PMOSFETs 611, 612, and 613 has a gate for receiving a respective bit P1, P2, or P3 of the CODE from the code generator 540 or 545. Such a CODE determines which of the PMOSFETs 611, 612, and 613 is turned on or turned off.

For example, when the CODE is '011', the PMOSFET 611 is turned off while the PMOSFETs 612 and 613 are turned on. In one embodiment of the present invention, when a turn-on impedance of the PMOS transistor 611 is 'X', a turn-on impedance of the PMOSFET 612 is '2X', and a turn-on impedance of the PMOSFET 613 is '4X'.

A second end of the resistor 615 is coupled to the pad 580 in FIG. 5A and is included for more linear control of the generated impedance of the impedance control transistor array 610. However, the present invention may be practiced without the resistor R1 or with a resistor coupled in other configurations with respect to the PMOSFETs 611, 612, and 613. The pull-up transistor array 410 of FIG. 4 that receives the final code may be implemented similarly to the impedance control transistor array 610 of FIG. 6A.

Referring to FIG. 6A, the fine tuning unit 620 includes an additional PMOSFET 621 having a source coupled to the power voltage VDD and having a drain coupled to the drains of the PMOSFETs 611, 612, and 613. Thus, the PMOSFET 621 is coupled in parallel with the PMOSFETs 611, 612, and 613. In one embodiment, a turn-on impedance of the PMOSFET 621 is 8X (i.e., larger than the turn-on impedance for each of the PMOSFETs 611, 612, and 613). The gate of the PMOSFET 621 receives the control signal C1 from the first controller 560 in FIG. 5A.

Figure 6B:
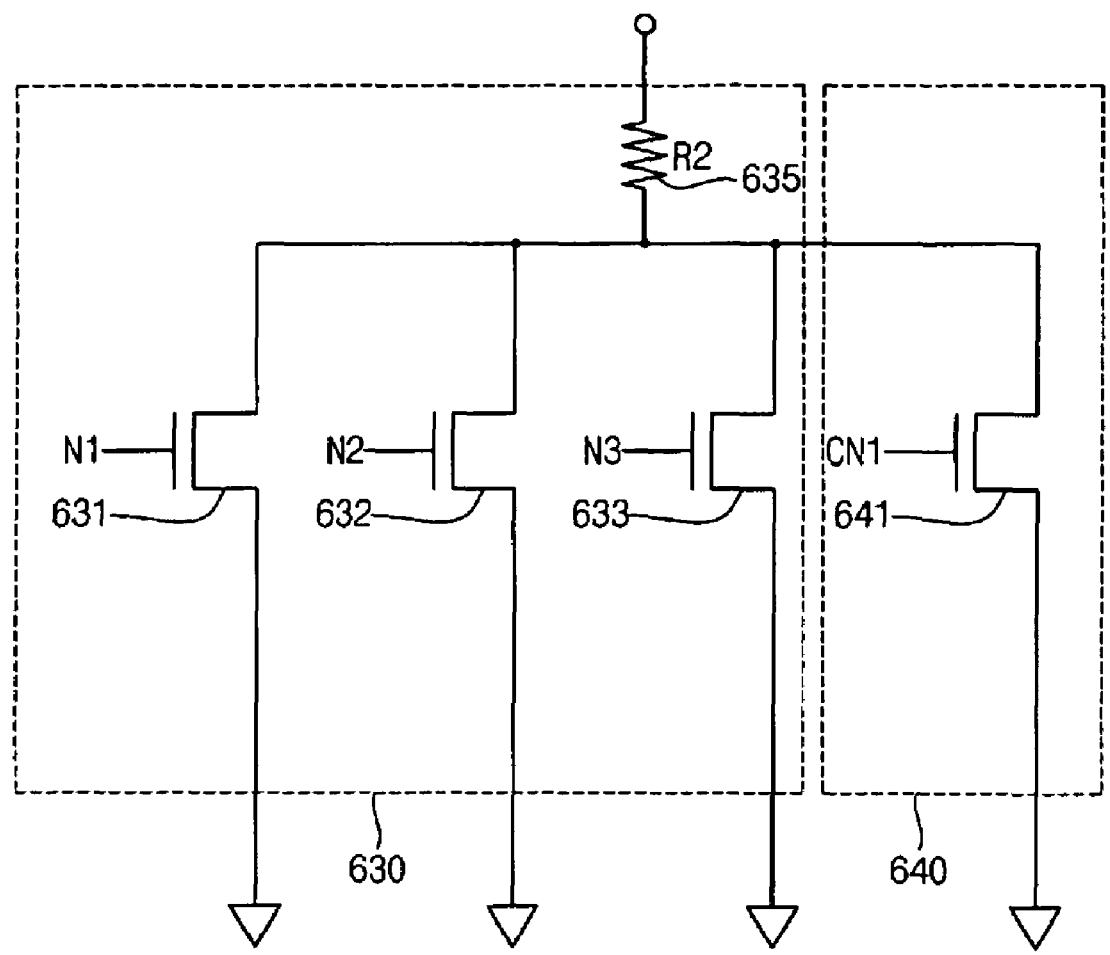

FIG. 6B is a circuit diagram of an impedance control transistor array 630 and a fine tuning unit 640 according to another embodiment of the present invention. The impedance control transistor array 630 and the fine tuning unit 640 of FIG. 6B may be used as the respective impedance control transistor array 515 and the fine tuning unit 525 of FIG. 5B.

Referring to FIG. 6B, the impedance control transistor array 630 includes three NMOSFETs 631, 632, and 633 coupled in parallel and a resistor 635. The NMOSFETs 631, 632, and 633 have sources coupled together to the ground node and have drains coupled together to a first end of the resistor R2 having a second end coupled to the pad 585 in FIG. 5B. Each of the NMOSFETs 631, 632, and 633 has a gate for receiving a respective bit N1, N2, or N3 of the CODE from the code generator 540 or 545.

Such a CODE determines which of the NMOSFETs 631, 632, and 633 is turned on or turned off. For example, a bit value of '1' may indicate a high voltage, and a bit value of '0' in the CODE may indicate a low voltage. In one embodiment of the present invention, if a turn-on impedance of the NMOSFET N1 is 'X', a turn-on impedance of the NMOSFET N2 is '2X', and a turn-on impedance of the NMOSFET N3 is '4X'. The pull-down transistor array 420 of FIG. 4 that receives the final code may be implemented similarly to the impedance control transistor array 630 of FIG. 6B.

Referring to FIG. 6B, the fine tuning unit 640 includes an additional NMOSFET 641 having a source coupled to the ground node and having a drain coupled to the resistor R2. Thus, the NMOSFET 641 is coupled in parallel with the NMOSFETs 631, 632, and 633. In one embodiment, a turn-on impedance of the NMOSFET 641 is 8X (i.e., larger than the turn-on impedance for each of the NMOSFETs 631, 632, and 633). The gate of the NMOSFET 641 receives the control signal C1 from the first controller 565 in FIG. 5B.

Figure 6C:
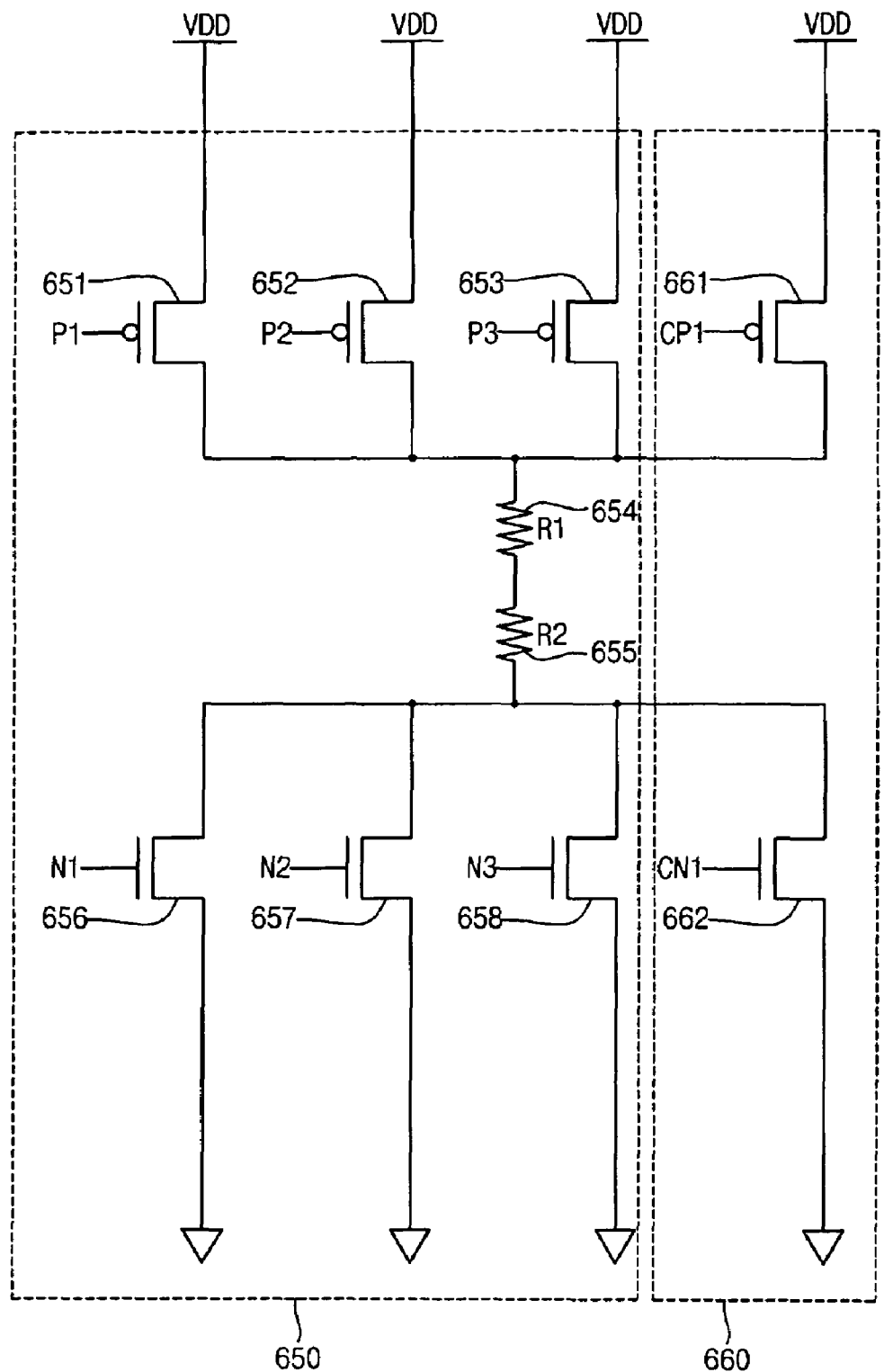

FIG. 6C is a circuit diagram of a impedance control transistor array 650 and a fine tuning unit 660 according to still another example embodiment of the present invention. Referring to FIG. 6C, the impedance control transistor array 650 includes three PMOSFETs 651, 652, 653 coupled in parallel and a resistor 654. The impedance control transistor array 650 also includes three NMOSFETs 656, 657 and 658 coupled in parallel and a resistor 655. The fine tuning unit 660 includes an additional PMOSFET 661 and an additional NMOSFET 662.

The PMOSFETs 651, 652, 653, and 661 operate similarly to those of FIG. 6A, and the NMOSFETs 656, 657, 658, and 662 operate similarly to those of FIG. 6B. Such PMOSFETs or NMOSFETs are used in FIG. 6C depending on the logic value at the I/O pad. The PMOSFETs are used for a logic value '1', and the NMOSFETs are used for a logic value of '0'. Thus, the pull-up transistor array 410 and the pull-down transistor array 420 of FIG. 4 that receives the final code may be implemented similarly to the impedance control transistor array 650 of FIG. 6C.

Figure 8:
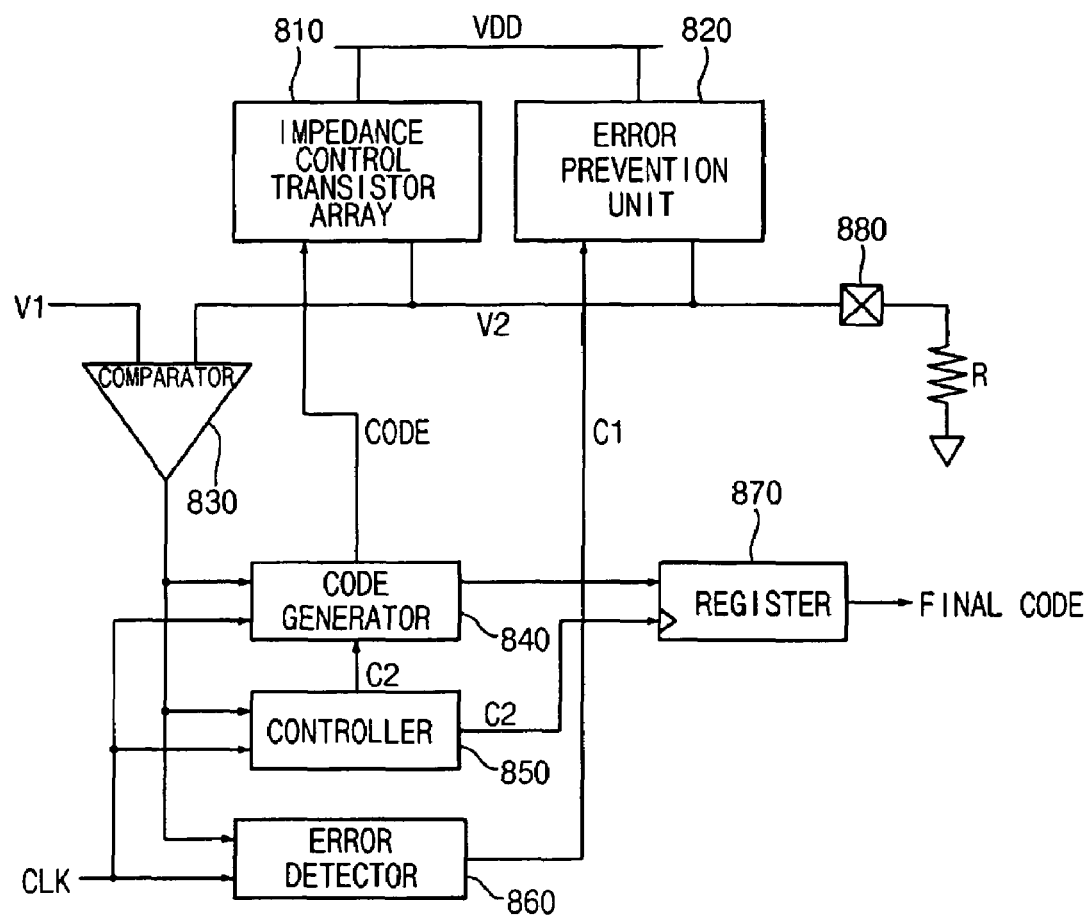
FIG. 8 is a block diagram of an impedance controller including error detection according to still another example embodiment of the present invention.

FIG. 8 is a block diagram of an impedance controller according to still another embodiment of the present invention. Referring to FIG. 8, the impedance controller includes an impedance control transistor array 810, a determination unit, and an error processing unit.

The impedance control transistor array 810 which may be implemented similarly to that of FIG. 6A provides a generated impedance that is determined by the CODE from a code generator 840. The determination unit includes a comparator 830, the code generator 840, a controller 850, and a register 870. The error processing unit includes an error prevention unit 820 and an error detector 860.

The comparator 830 outputs a logic value from comparing a reference voltage V1 with a node voltage V2 coupled to a pad 880 at a predetermined node. For example, when the node voltage V2 is greater than the reference voltage V1, the comparator 830 outputs a logic '1', and when the node voltage V2 is less than the reference voltage V1, the comparator 830 outputs a logic '0'. When the reference voltage V1 is substantially equal to the node voltage V2, the comparator 830 holds the last logic value.

A first end of a reference impedance R is coupled to the impedance control transistor array 810 through the pad 880, and a second end of the reference impedance R is coupled to the ground node. The code generator 840 increases or decreases the CODE for determining the generated impedance of the impedance control transistor array 810 until the reference voltage V1 is substantially equal to the node voltage V2.

The controller 850 activates a control signal C2 for indicating an impedance match. The controller 850 detects a predetermined bit pattern in the output of the comparator 830 to determine the final code resulting in the impedance match.

The error prevention unit 820 is coupled to the impedance control transistor array 810. When a control signal C1 from the error detector 860 to the error prevention unit 820 is not asserted, the error prevention unit 820 is turned off. When the control signal C1 is asserted, the error prevention unit 820 is turned on. When the error prevention unit 820 is turned on, the effective impedance Ra between the power voltage VDD and the predetermined node of the pad 880 is adjusted.

The error detector 860 asserts the control signal C1 when the comparator 830 outputs an undesired bit pattern. For example, the output of the comparator 860 may alternate irregularly due to noise, etc., when the impedance of the reference impedance R is precisely equal to the generated impedance of the impedance control transistor array 810.

The controller 850 then determines the final code with the error prevention unit 820 turned on. An operation of the error prevention unit 820 is described below with reference to the timing diagram of FIG. 9.

Figure 9:
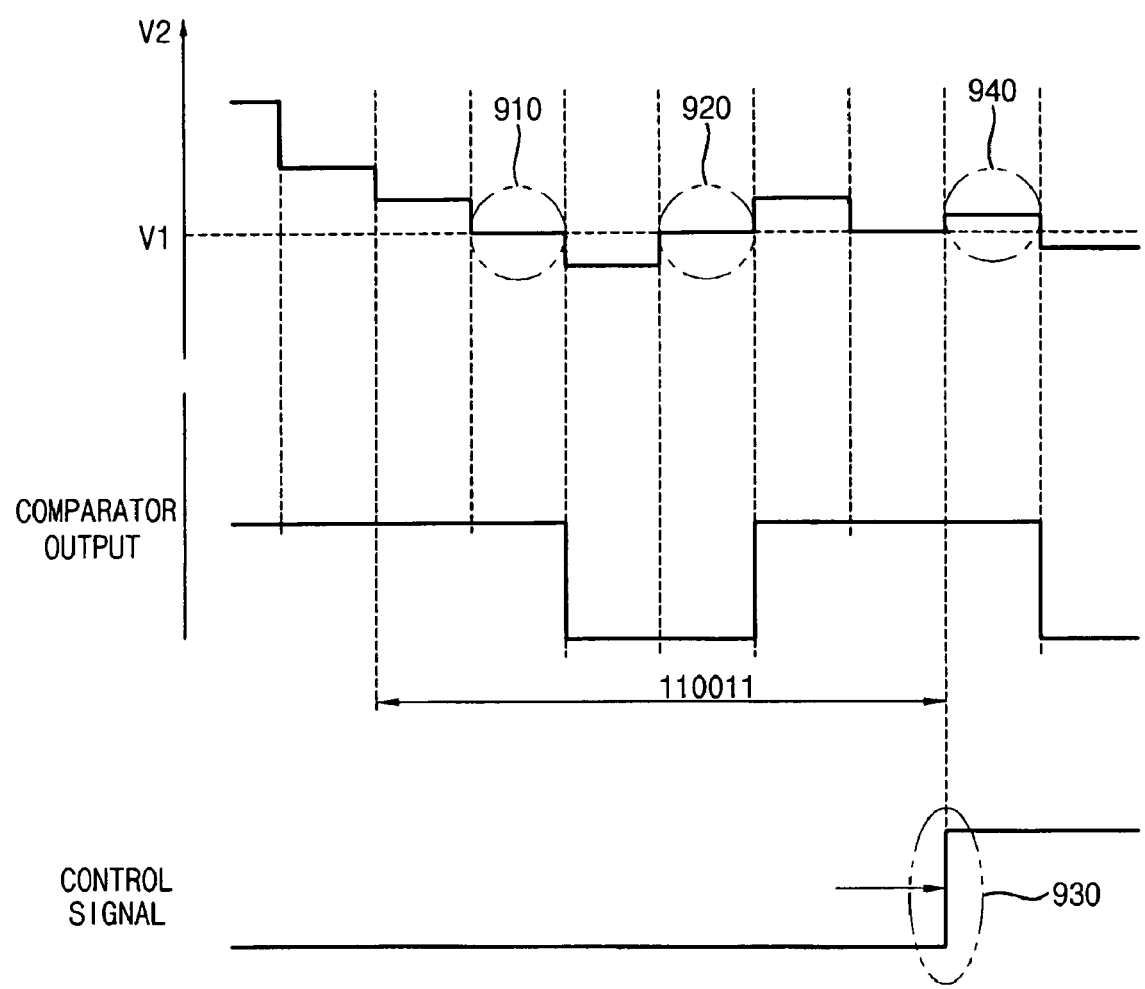
FIG. 9 is a timing diagram of signals during operation of the impedance controller of FIG. 8, according to an example embodiment of the present invention.

Referring to FIG. 9, if the CODE is '111', the generated impedance of the impedance control transistor array 810 has the lowest value such that the node voltage V2 has the highest value. When the reference voltage V1 is less than the node voltage V2, the comparator 830 outputs a logic '1' such that the code generator 840 decreases the CODE to '110'. With such a decrease to the CODE, if the comparator 830 still outputs a logic "1", the CODE is further decreased to '011', and so on until the reference impedance R is precisely equal to the generated impedance of the impedance control transistor array 810 such as when the CODE is "010" in the example of FIG. 9.

In that case, the node voltage V2 becomes equal to the node voltage V1 (refer to 910 in FIG. 9) such that the output of the comparator 830 may correspond to a logic '1' or a logic '0' depending on noise. Additionally in that case, the output of the comparator 830 may hold a previous value such that the comparator 830 outputs a logic '1'.

When the comparator 830 outputs a logic '1', the code generator 840 decreases the CODE to '001' such that the comparator 830 outputs a logic '0'. In that case, the code generator 840 increases the CODE to '010' again such that the node voltage V2 becomes equal to the reference voltage V1 (refer to 920), and the comparator 830 outputs a previous logic '0'. In this way, the output of the comparator 830 has the undesired bit pattern of '110011', and the error detector 860 asserts the control signal C1 upon detecting such an undesired bit pattern output by the comparator 830 (refer to 930 in FIG. 9).

When the control signal C1 is asserted, the error prevention unit 820 is turned on to decrease the effective impedance between the pad 880 and the power voltage VDD. Therefore, the node voltage V2 becomes higher than the reference voltage V1 (refer to 940) such that the output of the comparator 830 is logic '1'.

As a result, the code generator 840 decreases the CODE from '010' to '001' such that the comparator 830 outputs a logic '0'. The code generator 840 then increases the CODE to '010', and the output of the comparator 830 alternates normally between '1' and '0' such that the controller 850 may determine the final code to be stored into the register 870.

The impedance controller of FIG. 8 may alternatively be implemented with the impedance control transistor array 810 and the error prevention unit 820 coupled to the ground node similar to the example embodiment of FIG. 5B. The impedance control transistor array 810 and the error prevention unit 820 may be implemented similarly as shown in FIG. 6A, 6B, or 6C. In that case, the error prevention unit 820 may be implemented as the fine tuning unit 620, 640 or 660, while the impedance control transistor array 810 is implemented similarly to 610, 630, or 650. In one embodiment, a turn-on impedance of the error prevention unit 820 has a relatively high value such as '16X', for slightly shifting the effective impedance at the predetermined node of the pad 880 when the reference impedance R is precisely equal to the generated impedance of the impedance control transistor array 810.

Figure 10:
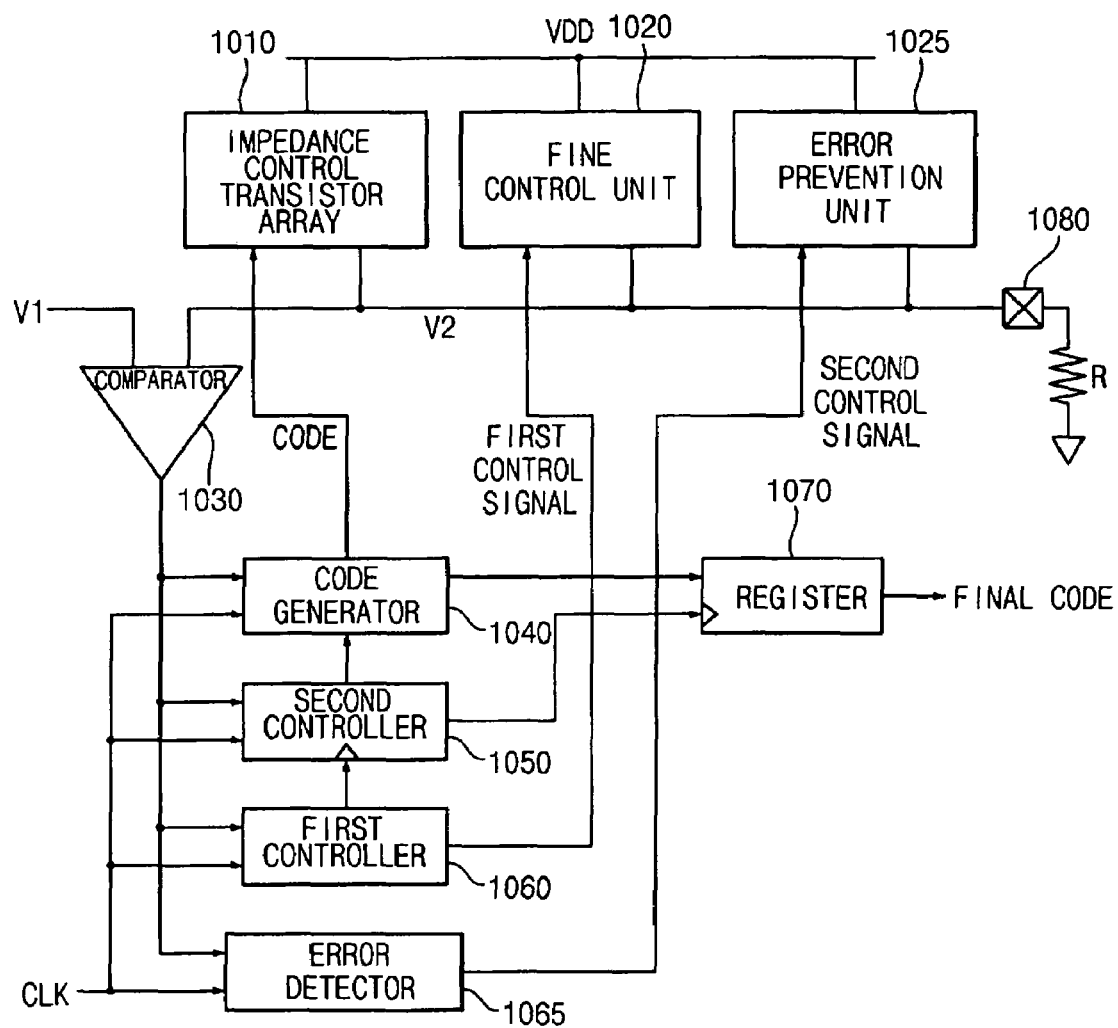
FIG. 10 is a block diagram of an impedance controller according to still another example embodiment of the present invention.

FIG. 10 is a block diagram of an impedance controller according to still another example embodiment of the present invention, which combines the features of the impedance controllers of FIGS. 5A and 8. Thus, the impedance controller of FIG. 10 includes an impedance control transistor array 1010, a fine control unit 1020, a comparator 1030, a code generator 1040, a first controller 1060, a second controller 1050, and a register 1070.

Such components operate similarly to like-named components of the impedance controller of FIG. 5A as described herein. Thus, the second controller 1050 selects a final code from two candidate codes as determined by the first controller 1060. The impedance controller of FIG. 10 also includes an error prevention unit 1025 and an error detector 1065 which operate similarly to like-named components of the impedance controller of FIG. 8 as described herein.

Figure 11A:
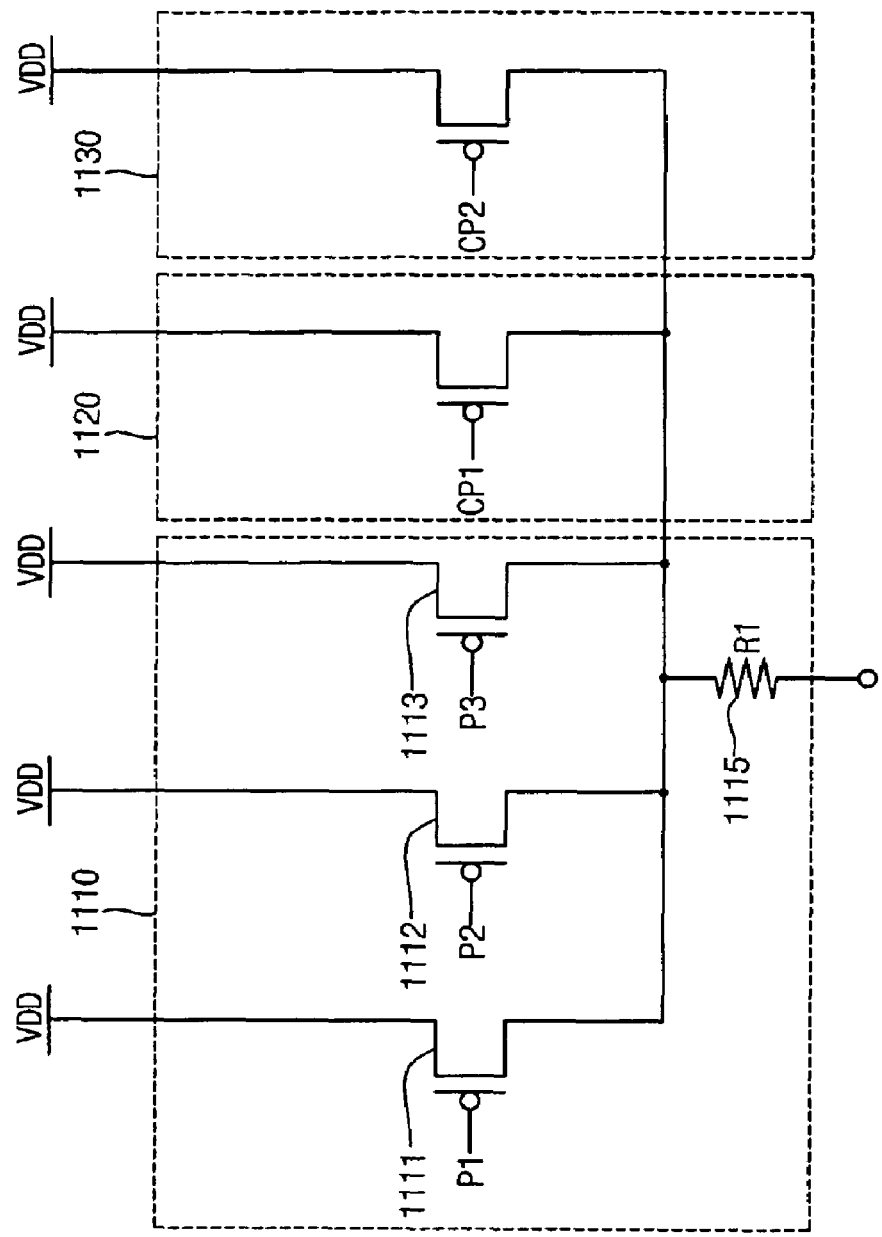
FIGS. 11A, 11B, and 11C are circuit diagrams of an impedance control transistor array, a fine tuning unit, and an error prevention unit, according to various example embodiments of the present invention.

FIG. 11A is a circuit diagram of a transistor array 1110, a fine tuning unit 1120, and an error prevention unit 1130 that may be the transistor array 1010, the fine tuning unit 1020, and the error prevention unit 1025 of FIG. 10, according to an example embodiment of the present invention. Referring to FIG. 11A, the transistor array 1110 includes three PMOSFETs 1110, 1120 and 1130 and a resistor 1115, which are configured similarly to the transistor array 610 of FIG. 6A.

In addition, the fine tuning unit 1120 of FIG. 11A is implemented with an additional PMOSFET similarly to the fine tuning unit 620 of FIG. 6A. The gate of the PMOSFET of the fine tuning unit 1120 is controlled by a first control signal CP1 (similar to control signal C1 in FIG. 5A) generated by the first controller 1060

Furthermore, the error prevention unit 1130 includes another PMOSFET that is also coupled in parallel to the PMOSFETs 1110, 1120 and 1130. The gate of the PMOSFET of the error prevention unit 1130 is controlled by a second control signal CP2 (similar to control signal C1 in FIG. 8) generated by the error detector 1065.

In one embodiment, a turn-on impedance of the error prevention unit 1130 is greater than each of the turn-on impedances of the PMOSFETs 1111, 1112, and 1113. For example, the turn-on impedance of the PMOSFET within the error prevention unit 1120 is '8X' when the turn-on impedances of the PMOSFETs 1111, 1112, and 1113 is 'X', '2X', and '4X', respectively.

The impedance controller of FIG. 10 may alternatively be implemented with the transistor array 1010, the fine tuning unit 1020, and the error prevention unit 1025 being coupled to the ground node similar to the example embodiment in FIG. 5B. In that case, the transistor array 1010, the fine tuning unit 1020, and the error prevention unit 1025 are implemented as a transistor array 1140, a fine tuning unit 1150, and an error prevention unit 1160 of FIG. 11B.

In that case, the transistor array 1140 includes three NMOSFETs 1141, 1142, and 1143 and a resistor 1145, and the fine tuning unit 1150 includes an additional NMOSFET, configured similarly as in FIG. 6B. Furthermore, the error prevention unit 1160 of FIG. 11B is implemented with another NMOSFET also coupled in parallel with the NMOSFETs 1141, 1142, and 1143.

Figure 11B:
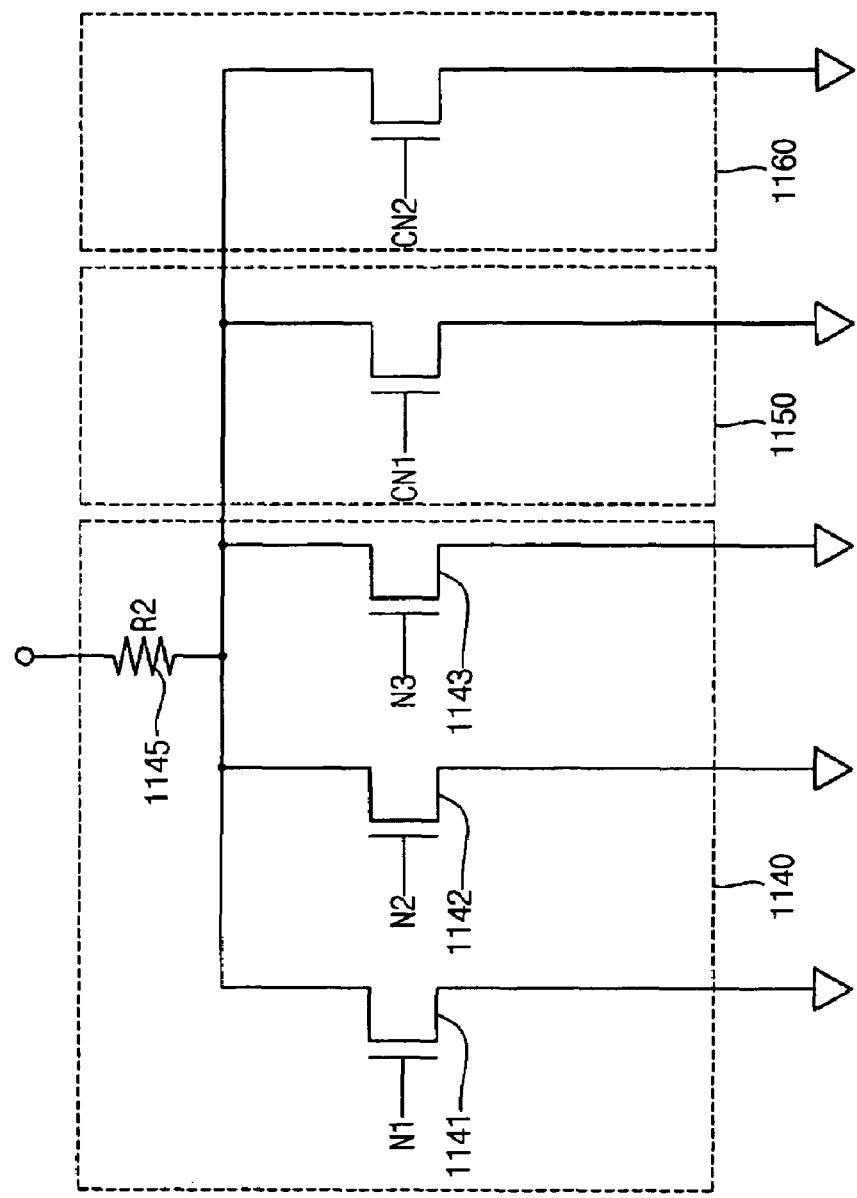

The transistor array 1140, the fine tuning unit 1150, and the error prevention unit 1160 of FIG. 11B operate similarly as described for similar named components of FIG. 11A. In one embodiment, the turn-on impedance of the NMOSFET within the error prevention unit 1160 is '8X' when the turn-on impedances of the NMOSFETs 1141, 1142, and 1143 is 'X', '2X', and '4X', respectively.

Figure 11C:
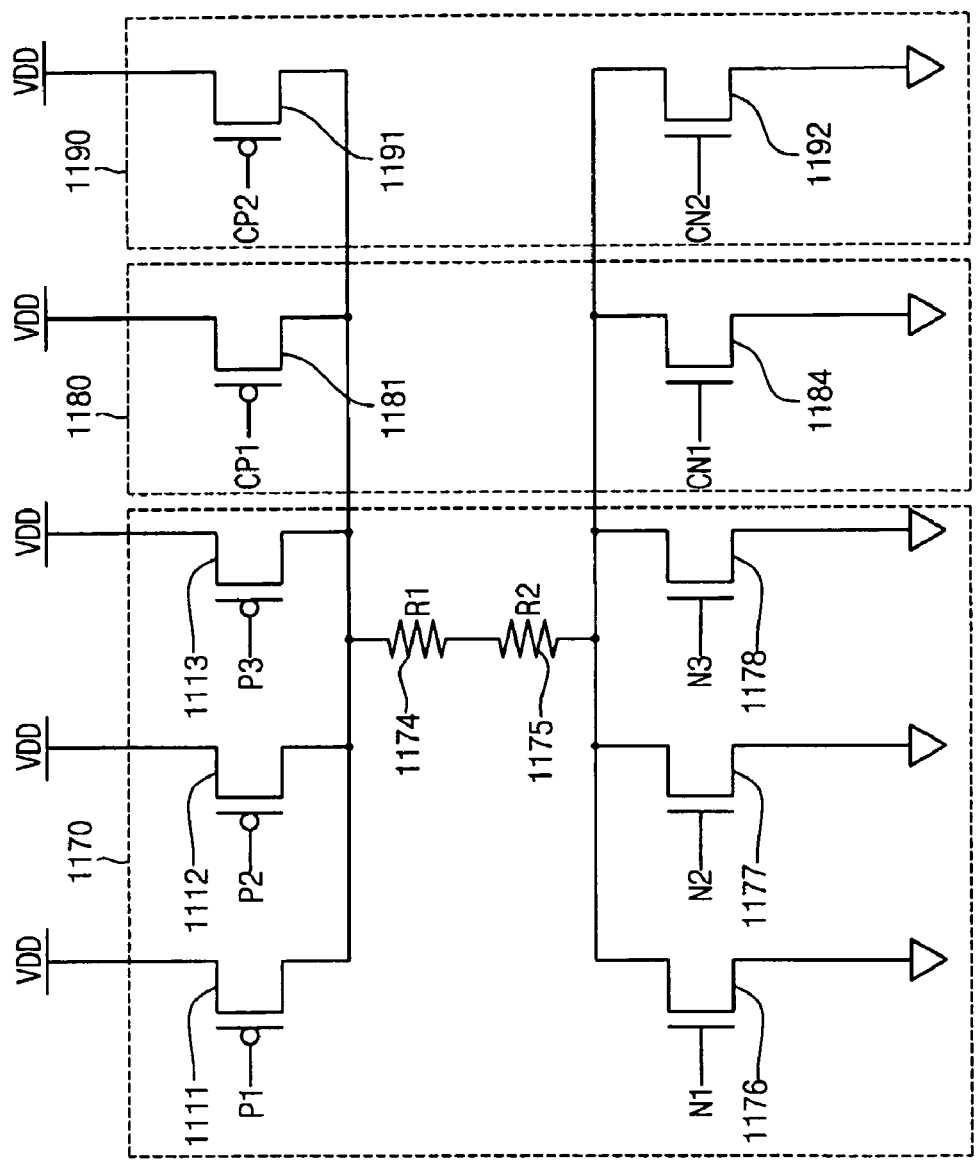

FIG. 11C is a circuit diagram of a impedance control transistor array 1170, a fine tuning unit 1180, and an error prevention unit 1190, according to still another example embodiment of the present invention. The impedance control transistor array 1170 of FIG. 11C includes three PMOSFETs 1111, 1112, and 1113, three NMOSFETs 1176, 1177, and 1178, and two resistors 1174 and 1175, configured similarly to the impedance control transistor array 650 of FIG. 6C. The fine tuning unit 1180 of FIG. 11C is implemented with an additional PMOSFET 1181 and an additional NMOSFET 1184 configured similarly to the fine tuning unit 660 of FIG. 6C.

Furthermore, the error prevention unit 1190 includes another PMOSFET 1191 coupled in parallel to the PMOSFETs 1111, 1112, 1113 and another NMOSFET 1192 coupled in parallel to the NMOSFETs 1176, 1177, 1178. In one embodiment of the present invention, a turn-on impedance of the fine tuning unit 1180 is '8X' and a turn-on impedance of the error prevention unit 1190 is '16X' when the turn-on impedances of the PMOSFETs 1111, 1112, and 1113 is 'X', '2X', and '4X', respectively, and the turn-on impedances of the NMOSFETs 1141, 1142, and 1143 is 'X', '2X', and '4X', respectively.

Figure 12:
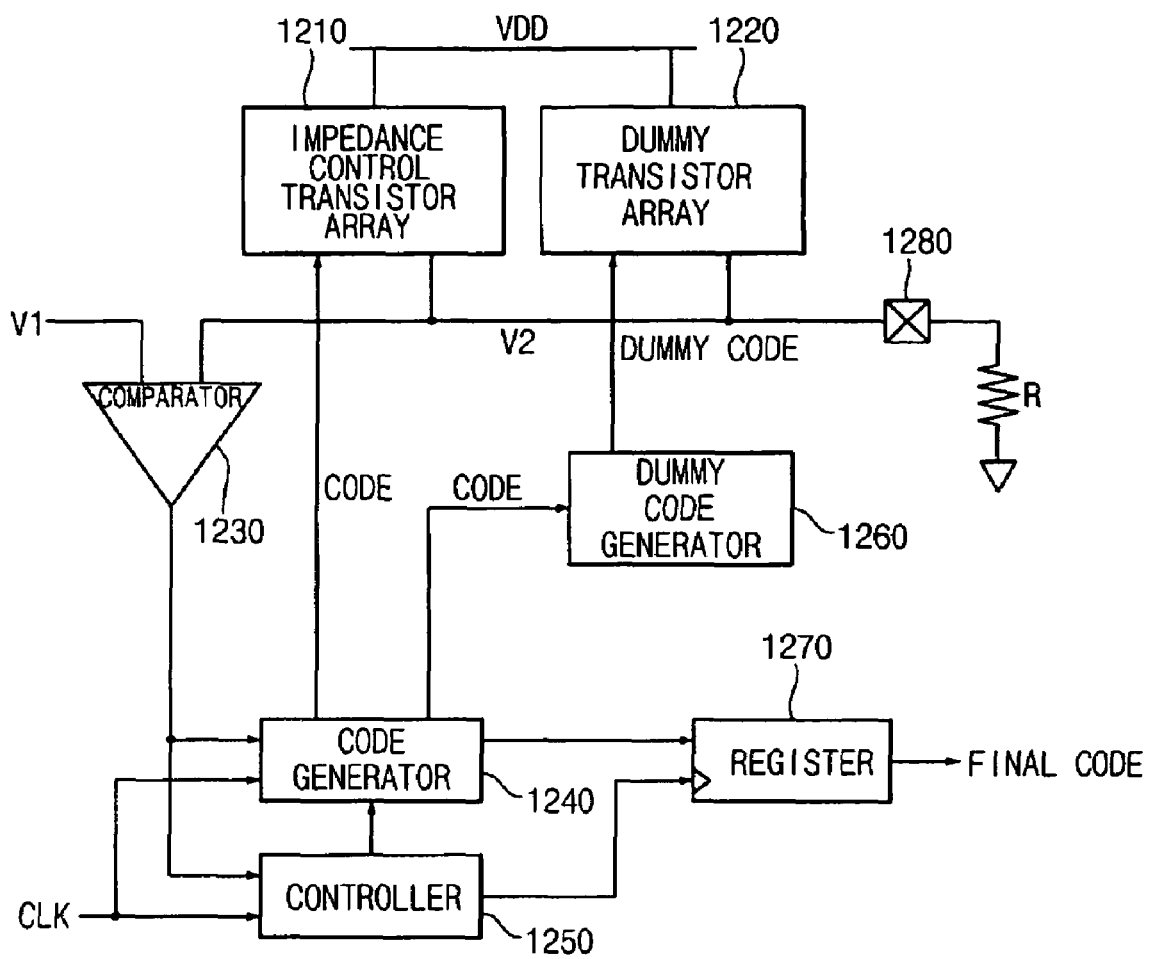
FIG. 12 is a block diagram of an impedance controller having a dummy code generator according to still another example embodiment of the present invention.

FIG. 12 is a block diagram of an impedance controller according to still another example embodiment of the present invention. The impedance controller of FIG. 12 includes an impedance control transistor array 1210, a dummy transistor array 1220, a comparator 1230, a code generator 1240, a controller 1250, a dummy code generator 1260, and a register 1270. The dummy transistor array 1220 and the dummy code generator 1260 form a dummy impedance unit. The impedance control transistor array 1210 is implemented similarly to FIG. 6A in one embodiment of the present invention, and the CODE from the code generator 1240 determines whether each transistor is turned on or off.

The dummy transistor array 1220 includes at least one dummy transistor, and a DUMMY CODE from the dummy code generator 1260 determines whether each dummy transistor is turned on or off. The dummy code generator 1260 is a logic circuit that generates the DUMMY CODE from the original CODE generated by the code generator 1240.

The comparator 1230 compares a reference voltage V1 with a node voltage V2 to output a logic value. The code generator 1240 increases or decreases the CODE until the reference voltage V1 is substantially equal to the node voltage V2.

The controller 1250 determines a final code when an effective impedance at the predetermined node of the pad 1280 comprised of the impedances of the transistor array 1210 and the dummy transistor array 1220 matches the reference impedance R. To that end, the controller 1250 detects a predetermined bit pattern such as alternating '1' and '0' in the output of the comparator 1230. The determined final code is stored into the register 1270.

The impedance controller of FIG. 12 may further include an error detector (not shown in FIG. 12) and an error prevention unit (not shown in FIG. 12) similarly to FIG. 8. Additionally, the impedance controller of FIG. 12 may further include a fine tuning unit and a second controller similarly to FIG. 5A. Furthermore, the impedance controller of FIG. 12 may be implemented with the impedance control transistor array 1210 and the dummy transistor array 1220 coupled to the ground node, similarly to FIG. 5B.

Figure 13:
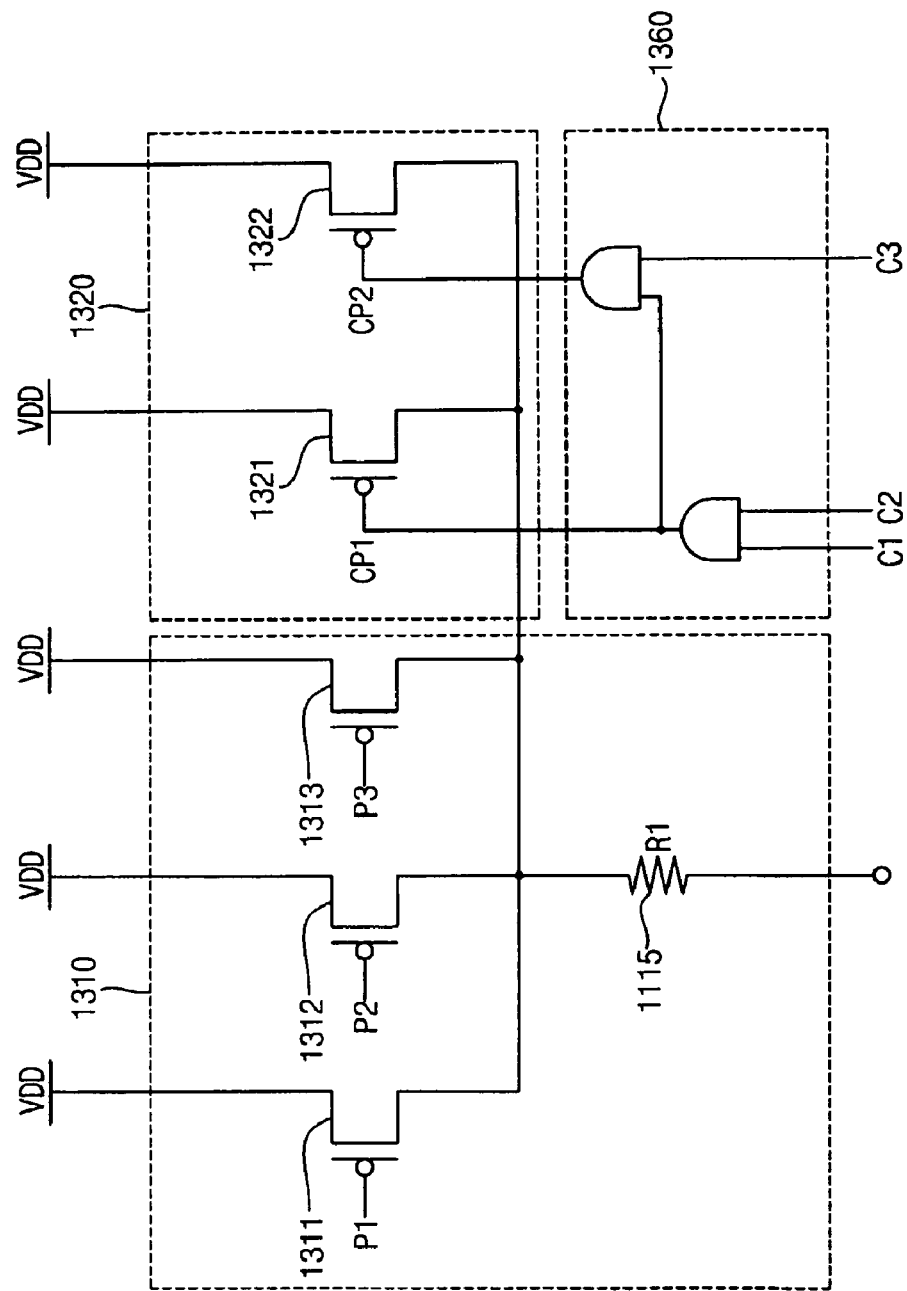
FIG. 13 is a circuit diagram illustrating an example embodiment of the impedance control transistor array, the dummy transistor array, and the dummy code generator in FIG. 12.

FIG. 13 is a circuit diagram of an impedance control transistor array 1310, a dummy transistor array 1320, and a dummy code generator 1360 that is an example implementation for those 1210, 1220, and 1260, respectively in FIG. 12. Referring to FIG. 13, the transistor array 1310 includes three PMOSFETs 1311, 1312, 1313 and a resistor 1115, configured similarly to FIG. 6A.

The dummy transistor array 1320 includes two PMOSFETs 1321 and 1322 having sources and drains coupled in parallel with the PMOSFETs 1311, 1312, 1313. Each of the gates of the PMOSFETs 1321 and 1322 has a respective bit CP1 or CP2 of the DUMMY CODE applied thereon.

Figure 14:
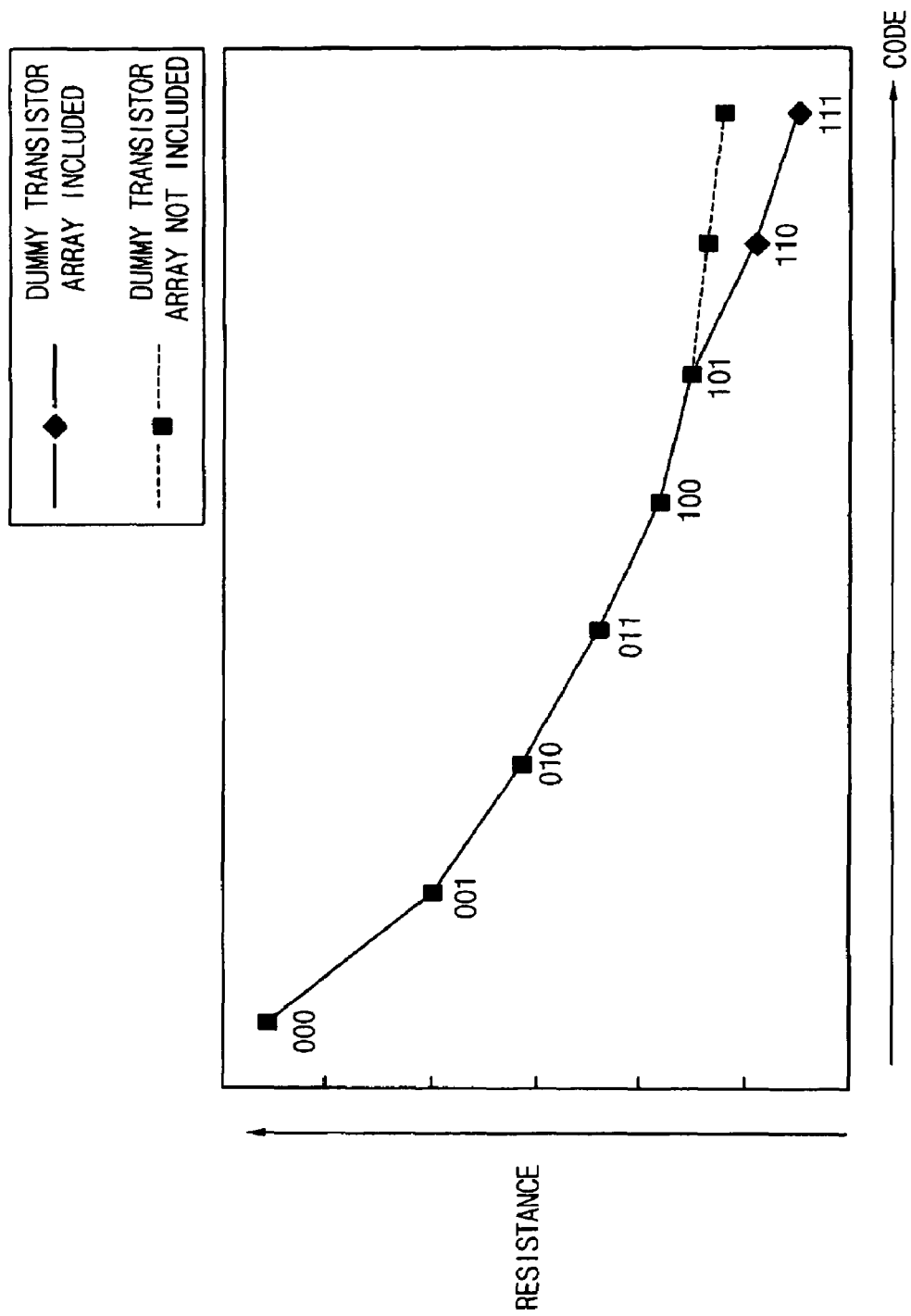
FIG. 14 is a graph of impedance versus code value for the impedance controller of FIG. 12.

The dummy code generator 1360 is a logic circuit that receives the bits C1, C2, C3 of the original CODE from the code generator 1240 to generate the DUMMY CODE. The generated impedance of the impedance control transistor array 1310 varies widely for lower values of the CODE, but varies more gradually for higher values of the CODE, as illustrated in FIG. 14. For improving linearity of impedance versus the CODE, at least one of the PMOSFETs 1321 and 1322 of the dummy transistor array 1320 is turned on.

In detail, when the bits C1, C2, and C3 of the CODE are '110', just the PMOSFET 1321 is turned on. When the bits C1, C2, and C3 of the CODE are '111', both of the PMOSFETs 1321 and 1322 are turned on. For the lower binary values of the CODE, '000', '001', '010', '011', '100' or '101', both of the PMOSFETs 1321 and 1322 are turned off.

With such operation of the dummy transistor array 1320, the effective impedance from that of the impedance control transistor array 1310 and the dummy transistor array 1320 varies more widely for the higher bit values of the CODE. Thus, such an effective impedance remains more linear even for the higher bit values of the CODE (as illustrated in FIG. 14).

Although the dummy code generator 1360 of FIG. 13 is implemented with two AND-gates, the dummy code generator 1360 may alternatively be implemented with other types of logic gates such as a NAND gate or a NOR gate. The pull-up transistor array 410 of FIG. 4 may be implemented similarly with the transistor array 1310, the dummy transistor array 1320, and the dummy code generator 1360. In another embodiment, the impedance control transistor array 1310 and the dummy transistor array 1320 may be implemented using NMOSFETs coupled to ground, or with both PMOSFETs and NMOSFETs.

In this manner, the impedance controllers according to the example embodiments of the present invention more accurately match the impedance generated by an I/O buffer to an external impedance coupled to an I/O pad. In addition, the impedance controller prevents errors that may occur due to generation of undesired bit patterns when such impedances are exactly matched. Furthermore, the impedance controller improves the linearity of impedance variation even for high values of the CODE.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, any specified numbers or number of elements or type of devices illustrated and described herein are by way of example only.

The present invention is limited only as defined in the following claims and equivalents thereof.

What is claimed is:

1. An impedance controller, comprising:
   an impedance control transistor array that generates, from a code, a generated impedance at a predetermined node;
   a first determination unit that determines two candidate codes for matching the generated impedance to a reference impedance; and
   a second determination unit that determines which one of the two candidate codes is a final code that best matches the generated impedance to the reference impedance;
   wherein the first determination unit includes:
   a comparator for comparing a generated voltage at the predetermined node to a reference voltage;
   a code generator that generates the code depending on an output of the comparator; and
   a first controller that determines the two candidate codes depending on a bit-pattern of the output of the comparator;
   and wherein the second determination unit includes:
   a fine tuning unit that is activated by the first controller to adjust a respective effective impedance at the predetermined node for each of the two candidate codes;
   a second controller for determining the final code depending on a respective output of the comparator for each of the two candidate codes with the fine tuning unit being activated; and
   a register for storing the final code.

2. The impedance controller of claim 1, wherein the reference impedance is coupled between the predetermined node and a ground node, and wherein the transistor array comprises a plurality of PMOSFETs (P-channel metal oxide semiconductor field effect transistors) coupled in parallel, with the code determining which of the PMOSFETs are turned on.

3. The impedance controller of claim 2, wherein the fine tuning unit includes an additional PMOSFET coupled in parallel with the PMOSFETs of the transistor array.

4. The impedance controller of claim 1, wherein the reference impedance is coupled between the predetermined node and a high power supply, and wherein the transistor array comprises a plurality of NMOSFETs (N-channel metal oxide semiconductor field effect transistors) coupled in parallel, with the code determining which of the NMOSFETs are turned on.

5. The impedance controller of claim 4, wherein the fine tuning unit includes an additional NMOSFET coupled in parallel with the NMOSFETs of the transistor array.

6. The impedance controller of claim 1, further comprising:
   an error detector for detecting an undesired bit-pattern in the output of the comparator; and
   an error prevention unit, coupled to the transistor array, that is activated for adjusting an effective impedance at the predetermined node such that the undesired bit-pattern is no longer output from the comparator.

7. The impedance controller of claim 6, wherein the reference impedance is coupled between the predetermined node and a ground node, and wherein the transistor array comprises a plurality of PMOSFETs (P-channel metal oxide semiconductor field effect transistors) coupled in parallel, with the code determining which of the PMOSFETs are turned on, and wherein the error prevention unit includes an additional PMOSFET coupled in parallel with the PMOSFETs of the transistor array.

8. The impedance controller of claim 6, wherein the reference impedance is coupled between the predetermined node and a high power supply, and wherein the transistor array comprises a plurality of NMOSFETs (N-channel metal oxide semiconductor field effect transistors) coupled in parallel, with the code determining which of the NMOSFETs are turned on, and wherein the error prevention unit includes an additional NMOSFET coupled in parallel with the NMOSFETs of the transistor array.

9. The impedance controller of claim 1, wherein the impedance controller is fabricated within a semiconductor device, and wherein the final code determines an I/O impedance generated by an I/O buffer coupled to an I/O pad of the semiconductor device.

10. The impedance controller of claim 9, wherein the reference impedance is substantially equal to an external impedance coupled to the I/O pad.

11. An impedance controller, comprising:
an impedance transistor array that generates, from a code, a generated impedance at a predetermined node;
a determination unit that determines a final code for matching the generated impedance to a reference impedance; and
an error processing unit for adjusting an effective impedance at the predetermined node when the determination unit operates irregularly,
wherein the reference impedance is coupled between the predetermined node and a high power supply, and wherein the impedance control transistor array and the error processing unit comprise a plurality of NMOSFETs (N-channel metal oxide semiconductor field effect transistors) coupled in parallel.

12. The impedance controller of claim 11, wherein the determination unit includes:
a comparator for comparing a generated voltage at the predetermined node to a reference voltage;
a code generator that generates the code depending on an output of the comparator; and
a controller that determines the final code depending on a bit-pattern of the output of the comparator.

13. The impedance controller of claim 12, wherein the error processing unit includes:
an error detector for detecting an undesired bit-pattern in the output of the comparator; and
an error prevention unit, coupled to the impedance control transistor array, that is activated for adjusting an effective impedance at the predetermined node such that the undesired bit-pattern is no longer output from the comparator.

14. The impedance controller of claim 13, wherein the reference impedance is coupled between the predetermined node and a ground node, and wherein the impedance control transistor array and the error prevention unit comprise a plurality of PMOSFETs (P-channel metal oxide semiconductor field effect transistors) coupled in parallel.

15. The impedance controller of claim 11, wherein the impedance controller is fabricated within a semiconductor device, and wherein the final code determines an I/O impedance generated by an I/O buffer coupled to an I/O pad of the semiconductor device, and wherein the reference impedance is substantially equal to an external impedance coupled to the I/O pad.

16. An impedance controller comprising:
an impedance control transistor array that generates, from an original code, a generated impedance at a predetermined node;
a determination unit that determines a final code for matching the generated impedance to a reference impedance; and
a dummy impedance unit for adjusting an effective impedance at the predetermined node for a predetermined set of at least one original code, wherein the dummy impedance unit includes:
a dummy code generator for generating a dummy code from the original code; and
a dummy transistor array that generates, from the dummy code, an additional impedance at the predetermined node for the predetermined set of the at least one original code.

17. The impedance controller of claim 16, wherein the determination unit includes:
a comparator for comparing a generated voltage at the predetermined node to a reference voltage;
a first code generator that generates the original code depending on an output of the comparator; and
a controller that determines the final code depending on a bit-pattern of the output of the comparator.

18. The impedance controller of claim 16, wherein the reference impedance is coupled between the predetermined node and a ground node, and wherein the impedance control transistor array and the dummy transistor array comprise a plurality of PMOSFETs (P-channel metal oxide semiconductor field effect transistors) coupled in parallel.

19. The impedance controller of claim 16, wherein the reference impedance is coupled between the predetermined node and a high power supply, and wherein the impedance control transistor array and the dummy transistor array comprise a plurality of NMOSFETs (N-channel metal oxide semiconductor field effect transistors) coupled in parallel.

20. The impedance controller of claim 16, wherein the impedance controller is fabricated within a semiconductor device, and wherein the final code determines an I/O impedance generated by an I/O buffer coupled to an I/O pad of the semiconductor device, and wherein the reference impedance is substantially equal to an external impedance coupled to the I/O pad.

* * * * *